United States Patent
Perz et al.

(10) Patent No.: US 7,653,260 B2
(45) Date of Patent: Jan. 26, 2010

(54) SYSTEM AND METHOD OF REGISTERING FIELD OF VIEW

(75) Inventors: Cynthia B. Perz, Huntington Beach, CA (US); Jose De La Torre-Bueno, Carlsbad, CA (US)

(73) Assignee: Carl Zeis MicroImaging GmbH, Jena (DE)

(*) Notice: Subject to any disclaimer, the term of this patent is extended or adjusted under 35 U.S.C. 154(b) by 912 days.

(21) Appl. No.: 10/872,138

(22) Filed: Jun. 17, 2004

(65) Prior Publication Data

US 2005/0281484 A1    Dec. 22, 2005

(51) Int. Cl.
*G06K 9/36*    (2006.01)

(52) U.S. Cl. ............... 382/284; 382/128; 382/133

(58) Field of Classification Search .......... 382/284
See application file for complete search history.

(56) References Cited

U.S. PATENT DOCUMENTS

| | | | |
|---|---|---|---|
| 3,824,393 A | 7/1974 | Brain | |
| 3,851,972 A | 12/1974 | Smith et al. | |
| 4,011,004 A | 3/1977 | Levine et al. | |
| 4,125,828 A | 11/1978 | Resnick et al. | |
| 4,196,265 A | 4/1980 | Koprowski et al. | |
| 4,210,419 A | 7/1980 | Castleman | |
| 4,249,825 A | 2/1981 | Shapiro | |
| 4,338,024 A | 7/1982 | Bolz et al. | |
| 4,342,905 A | 8/1982 | Fujii et al. | |
| 4,349,528 A | 9/1982 | Koprowski et al. | |
| 4,364,932 A | 12/1982 | Kung et al. | |
| 4,364,933 A | 12/1982 | Kung et al. | |
| 4,364,934 A | 12/1982 | Kung et al. | |
| 4,364,935 A | 12/1982 | Kung et al. | |
| 4,364,936 A | 12/1982 | Kung et al. | |
| 4,364,937 A | 12/1982 | Kung et al. | |

(Continued)

FOREIGN PATENT DOCUMENTS

DE    3340647    5/1985

(Continued)

OTHER PUBLICATIONS

Arklie, et al., "Differentiation Antigens Expressed by Epithelial Cells in the Lactating Breast are also Detectable in Breast Cancers", *Int. J. Cancer*, vol. 28, pp. 23-29, 1981.

(Continued)

*Primary Examiner*—Sath V Perungavoor
(74) *Attorney, Agent, or Firm*—Patterson, Thuente, Skaar & Christensen, P.A.

(57) ABSTRACT

Disclosed is a system for and a method of registering images captured by a computer-controlled microscope. The imaging system of the present invention includes a computer-controlled microscope electrically connected to a controller having a display device. The microscope further includes a barcode reader, a camera, a serial interface, one or more sensors, one or more motors, a light source, a turret, and a data interface. The method of image registration includes the steps of defining areas of interest on a microscope slide, creating a database of microscopic image locations, commanding a microscope to each location, capturing and storing an image, calculating correlation with neighbors, registering correlation scores and offsets, determining an anchor, and attaching neighbors using correlation scores and offsets.

22 Claims, 9 Drawing Sheets

U.S. PATENT DOCUMENTS

| | | | |
|---|---|---|---|
| 4,393,466 A | 7/1983 | Deindorfer et al. | |
| 4,513,438 A | 4/1985 | Graham et al. | |
| 4,612,614 A | 9/1986 | Deindorfer et al. | |
| 4,656,594 A | 4/1987 | Ledley | |
| 4,673,973 A | 6/1987 | Ledley | |
| 4,700,298 A | 10/1987 | Palcic et al. | |
| 4,741,043 A | 4/1988 | Bacus et al. | |
| 4,939,240 A | 7/1990 | Chu et al. | |
| 4,945,220 A | 7/1990 | Mallory et al. | |
| 4,965,725 A | 10/1990 | Rutenberg | |
| 4,991,223 A | 2/1991 | Bradley | |
| 5,003,165 A | 3/1991 | Sarfati et al. | |
| 5,008,185 A | 4/1991 | Bacus | |
| 5,016,173 A | 5/1991 | Kenet et al. | |
| 5,018,209 A * | 5/1991 | Bacus | 382/129 |
| 5,051,816 A | 9/1991 | Harrison et al. | |
| 5,068,909 A | 11/1991 | Rutherford et al. | |
| 5,085,325 A | 2/1992 | Jones et al. | |
| 5,086,477 A * | 2/1992 | Yu et al. | 382/145 |
| 5,087,965 A | 2/1992 | Torre-Bueno | |
| 5,123,055 A | 6/1992 | Kasdan | |
| 5,140,647 A * | 8/1992 | Ise et al. | 382/284 |
| 5,202,931 A | 4/1993 | Bacus | |
| 5,218,645 A * | 6/1993 | Bacus | 382/133 |
| 5,231,580 A | 7/1993 | Cheung et al. | |
| 5,233,684 A | 8/1993 | Ulichney | |
| 5,235,522 A | 8/1993 | Bacus | |
| 5,254,845 A | 10/1993 | Burgess et al. | |
| 5,257,182 A * | 10/1993 | Luck et al. | 382/224 |
| 5,268,966 A * | 12/1993 | Kasdan | 382/133 |
| 5,287,272 A * | 2/1994 | Rutenberg et al. | 382/224 |
| 5,301,244 A * | 4/1994 | Parulski | 382/319 |
| 5,317,140 A | 5/1994 | Dunthorn | |
| 5,321,545 A | 6/1994 | Bisconte | |
| 5,333,207 A | 7/1994 | Rutenberg | |
| 5,338,924 A | 8/1994 | Barrett et al. | |
| 5,352,613 A | 10/1994 | Tafas et al. | |
| 5,375,177 A | 12/1994 | Vaidyanathan et al. | |
| 5,409,007 A | 4/1995 | Saunders et al. | |
| 5,422,018 A | 6/1995 | Saunders et al. | |
| 5,428,690 A | 6/1995 | Bacus et al. | |
| 5,432,054 A | 7/1995 | Saunders et al. | |
| 5,432,871 A | 7/1995 | Novik | |
| 5,449,622 A | 9/1995 | Yabe et al. | |
| 5,459,384 A | 10/1995 | Engelse et al. | |
| 5,463,470 A | 10/1995 | Terashita et al. | |
| 5,469,353 A | 11/1995 | Pinsky et al. | |
| 5,473,706 A | 12/1995 | Bacus et al. | |
| 5,481,401 A | 1/1996 | Kita et al. | |
| 5,489,386 A | 2/1996 | Saunders | |
| 5,499,097 A | 3/1996 | Ortyn et al. | |
| 5,515,172 A | 5/1996 | Shiau | |
| 5,526,258 A | 6/1996 | Bacus | |
| 5,533,628 A | 7/1996 | Tao | |
| 5,544,650 A | 8/1996 | Boon et al. | |
| 5,546,323 A | 8/1996 | Bacus et al. | |
| 5,561,611 A * | 10/1996 | Avinash | 702/111 |
| 5,583,666 A | 12/1996 | Ellson et al. | |
| 5,585,469 A | 12/1996 | Kojima et al. | |
| 5,586,160 A | 12/1996 | Mascio | |
| 5,602,941 A | 2/1997 | Charles et al. | |
| 5,610,022 A | 3/1997 | Battifora | |
| 5,619,032 A * | 4/1997 | Kasdan | 250/201.3 |
| 5,625,705 A | 4/1997 | Recht | |
| 5,625,709 A * | 4/1997 | Kasdan | 382/203 |
| 5,633,491 A * | 5/1997 | Kasdan | 250/201.3 |
| 5,635,402 A | 6/1997 | Alfano et al. | |
| 5,644,139 A * | 7/1997 | Allen et al. | 250/557 |
| 5,646,677 A | 7/1997 | Reber et al. | |
| 5,647,025 A * | 7/1997 | Frost et al. | 382/255 |
| 5,671,288 A * | 9/1997 | Wilhelm et al. | 382/128 |
| 5,686,960 A * | 11/1997 | Sussman et al. | 348/218.1 |
| 5,690,892 A | 11/1997 | Babler et al. | |
| 5,691,779 A | 11/1997 | Yamashita et al. | |
| 5,701,172 A | 12/1997 | Azzazy | |
| 5,706,093 A | 1/1998 | Komiya | |
| 5,726,009 A | 3/1998 | Conners et al. | |
| 5,731,156 A | 3/1998 | Golbus | |
| 5,735,387 A | 4/1998 | Polaniec et al. | |
| 5,740,267 A | 4/1998 | Echerer et al. | |
| 5,740,270 A * | 4/1998 | Rutenberg et al. | 382/133 |
| 5,773,459 A | 6/1998 | Tang et al. | |
| 5,783,814 A | 7/1998 | Fairley et al. | |
| 5,795,723 A | 8/1998 | Tapscott et al. | |
| 5,796,861 A * | 8/1998 | Vogt et al. | 382/128 |
| 5,799,105 A | 8/1998 | Tao | |
| 5,812,629 A * | 9/1998 | Clauser | 378/62 |
| 5,846,749 A | 12/1998 | Slamon et al. | |
| 5,851,186 A | 12/1998 | Wood et al. | |
| 5,854,851 A | 12/1998 | Bamberger et al. | |
| 5,867,598 A | 2/1999 | De Queiroz | |
| 5,877,161 A | 3/1999 | Riabowol | |
| 5,880,473 A | 3/1999 | Ginestet | |
| 5,888,742 A | 3/1999 | Lal et al. | |
| 5,889,881 A | 3/1999 | MacAulay et al. | |
| 5,911,003 A | 6/1999 | Sones | |
| 5,911,327 A | 6/1999 | Tanaka et al. | |
| 5,962,234 A | 10/1999 | Golbus | |
| 5,966,309 A | 10/1999 | O'Bryan et al. | |
| 5,966,465 A | 10/1999 | Keith et al. | |
| 5,982,951 A * | 11/1999 | Katayama et al. | 382/284 |
| 6,005,681 A * | 12/1999 | Pollard | 358/473 |
| 6,006,191 A | 12/1999 | DiRienzo | |
| 6,007,996 A | 12/1999 | McNamara et al. | |
| 6,011,595 A | 1/2000 | Henderson et al. | |
| 6,031,929 A | 2/2000 | Maitz et al. | |
| 6,031,930 A * | 2/2000 | Bacus et al. | 382/133 |
| 6,040,139 A | 3/2000 | Bova | |
| 6,058,322 A | 5/2000 | Nishikawa et al. | |
| 6,069,242 A | 5/2000 | Zavada et al. | |
| 6,072,570 A | 6/2000 | Chipman et al. | |
| 6,087,134 A | 7/2000 | Saunders | |
| 6,097,838 A | 8/2000 | Klassen et al. | |
| 6,101,265 A * | 8/2000 | Bacus et al. | 382/133 |
| 6,117,985 A | 9/2000 | Thomas et al. | |
| 6,122,017 A * | 9/2000 | Taubman | 348/620 |
| 6,122,400 A | 9/2000 | Reitmeier | |
| 6,125,194 A | 9/2000 | Yeh et al. | |
| 6,141,602 A | 10/2000 | Igarashi et al. | |
| 6,151,535 A | 11/2000 | Ehlers | |
| 6,160,618 A | 12/2000 | Garner | |
| 6,169,816 B1 | 1/2001 | Ravkin | |
| 6,203,987 B1 | 3/2001 | Friend et al. | |
| 6,215,892 B1 | 4/2001 | Douglass et al. | |
| 6,215,894 B1 * | 4/2001 | Zeleny et al. | 382/133 |
| 6,225,636 B1 | 5/2001 | Ginestet | |
| 6,226,392 B1 * | 5/2001 | Bacus et al. | 382/128 |
| 6,226,636 B1 | 5/2001 | Mottaleb et al. | |
| 6,236,031 B1 | 5/2001 | Ueda | |
| 6,238,892 B1 | 5/2001 | Mercken et al. | |
| 6,255,465 B1 | 7/2001 | Ferguson-Smith et al. | |
| 6,259,807 B1 | 7/2001 | Ravkin | |
| 6,259,826 B1 * | 7/2001 | Pollard et al. | 382/284 |
| 6,270,971 B1 | 8/2001 | Ferguson-Smith et al. | |
| 6,272,235 B1 * | 8/2001 | Bacus et al. | 382/133 |
| 6,281,874 B1 | 8/2001 | Sivan et al. | |
| 6,290,907 B1 | 9/2001 | Takahashi et al. | |
| 6,313,452 B1 | 11/2001 | Paragano et al. | |
| 6,351,712 B1 | 2/2002 | Stoughton et al. | |
| 6,352,861 B1 | 3/2002 | Copeland et al. | |
| 6,374,989 B1 | 4/2002 | Van Dyke, Jr. et al. | |
| 6,379,929 B1 | 4/2002 | Burns et al. | |

| | | | | |
|---|---|---|---|---|
| 6,396,941 B1 * | 5/2002 | Bacus et al. | ............... | 382/128 |
| 6,404,906 B2 * | 6/2002 | Bacus et al. | ............... | 382/128 |
| 6,418,236 B1 * | 7/2002 | Ellis et al. | .................. | 382/128 |
| 6,466,690 B2 | 10/2002 | Bacus et al. | | |
| 6,468,476 B1 | 10/2002 | Friend et al. | | |
| 6,518,554 B1 | 2/2003 | Zhang | | |
| 6,522,774 B1 * | 2/2003 | Bacus et al. | ............... | 382/133 |
| 6,553,135 B1 | 4/2003 | Douglass et al. | | |
| 6,606,413 B1 * | 8/2003 | Zeineh | ...................... | 382/232 |
| 6,625,332 B1 * | 9/2003 | Nakao | ...................... | 382/294 |
| 6,631,203 B2 | 10/2003 | Ellis et al. | | |
| 6,647,151 B1 * | 11/2003 | Stallbaumer et al. | ........ | 382/275 |
| 6,671,393 B2 | 12/2003 | Hays et al. | | |
| 6,674,884 B2 * | 1/2004 | Bacus et al. | ............... | 382/133 |
| 6,674,896 B1 | 1/2004 | Torre-Bueno | | |
| 6,697,509 B2 | 2/2004 | Torre-Bueno | | |
| 6,711,283 B1 * | 3/2004 | Soenksen | .................... | 382/133 |
| 6,718,053 B1 | 4/2004 | Ellis et al. | | |
| 6,775,402 B2 * | 8/2004 | Bacus et al. | ............... | 382/133 |
| 7,027,628 B1 * | 4/2006 | Gagnon et al. | ............. | 382/128 |
| 7,031,507 B2 * | 4/2006 | Bacus et al. | ............... | 382/133 |
| 7,035,478 B2 * | 4/2006 | Crandall et al. | ............. | 382/284 |
| 7,194,118 B1 * | 3/2007 | Harris et al. | ............... | 382/128 |
| 7,253,420 B2 * | 8/2007 | Motomura | ............... | 250/458.1 |
| 7,305,109 B1 * | 12/2007 | Gagnon et al. | ............. | 382/128 |
| 2001/0050999 A1 * | 12/2001 | Bacus et al. | ............... | 382/128 |
| 2002/0034762 A1 | 3/2002 | Muller et al. | | |
| 2002/0061127 A1 * | 5/2002 | Bacus et al. | ............... | 382/128 |
| 2002/0067409 A1 | 6/2002 | Harari et al. | | |
| 2002/0164810 A1 | 11/2002 | Dukor et al. | | |
| 2002/0181762 A1 * | 12/2002 | Silber | ...................... | 382/154 |
| 2002/0184605 A1 * | 12/2002 | Matsuoka | ...................... | 716/4 |
| 2003/0002718 A1 * | 1/2003 | Hamid | ...................... | 382/124 |
| 2003/0048931 A1 * | 3/2003 | Johnson et al. | ............. | 382/128 |
| 2003/0123717 A1 * | 7/2003 | Bacus et al. | ............... | 382/128 |
| 2003/0124589 A1 | 7/2003 | Piper | | |
| 2003/0138140 A1 | 7/2003 | Marcelpoil et al. | | |
| 2003/0170703 A1 | 9/2003 | Piper et al. | | |
| 2004/0008894 A1 * | 1/2004 | Zeineh | ...................... | 382/240 |
| 2004/0136582 A1 * | 7/2004 | Bacus et al. | ............... | 382/128 |
| 2004/0141637 A1 * | 7/2004 | Bacus et al. | ............... | 382/128 |
| 2004/0252875 A1 * | 12/2004 | Crandall et al. | ............. | 382/133 |
| 2005/0082494 A1 * | 4/2005 | Motomura | ............... | 250/458.1 |
| 2005/0084175 A1 * | 4/2005 | Olszak | ...................... | 382/284 |
| 2005/0163398 A1 * | 7/2005 | Ioka | ............................ | 382/284 |
| 2005/0254696 A1 * | 11/2005 | Bacus et al. | ............... | 382/128 |
| 2005/0281484 A1 * | 12/2005 | Perz et al. | .................. | 382/294 |
| 2006/0034543 A1 * | 2/2006 | Bacus et al. | ............... | 382/284 |
| 2006/0045388 A1 * | 3/2006 | Zeineh et al. | ............... | 382/312 |
| 2006/0133657 A1 * | 6/2006 | Schmid et al. | ............. | 382/128 |
| 2007/0019846 A1 * | 1/2007 | Bullitt et al. | ................ | 382/128 |
| 2007/0036462 A1 * | 2/2007 | Crandall et al. | ............. | 382/284 |
| 2007/0280517 A1 * | 12/2007 | De La Torre-Bueno et al. | ........................ | 382/128 |
| 2008/0032328 A1 * | 2/2008 | Cline et al. | ................ | 435/40.5 |

FOREIGN PATENT DOCUMENTS

| | | |
|---|---|---|
| DE | 3735091 | 4/1988 |
| EP | 0213666 | 3/1987 |
| EP | 0557871 | 9/1993 |
| EP | 0713086 | 5/1996 |
| WO | WO 92/17848 | 10/1992 |
| WO | WO 97/20198 | 6/1997 |
| WO | WO 00/49391 | 8/2000 |
| WO | WO 01/25476 | 4/2001 |
| WO | WO 01/37206 | 5/2001 |
| WO | WO 03/003057 | 1/2003 |
| WO | WO 03/014795 | 2/2003 |
| WO | WO 03/040064 | 5/2003 |

OTHER PUBLICATIONS

Atassi, "Precise Determination of Protein Antigenic Structures has Unravelled the Molecular Immune Recognition of Proteins and Provided a Prototype for Synthetic Mimicking of Other Protein Binding Sites", *Molecular & Cellular Biochemistry*, vol. 32, pp. 21-43, 1980.

Aziz, "Quantitation of Estrogen and Progesterone Receptors by Immunocytochemical and Image Analyses", *American Journal of Clinical Pathology*, vol. 98, No. 1, pp. 105-111, Jul. 1992.

Bacus, et al., "The Evaluation of Estrogen Receptor in Primary Breast Carcinoma by Computer-Assisted Image Analysis", *American Journal of Clinical Pathology*, vol. 90, No. 2, pp. 233-239, Aug. 1988.

Baddoura, et al., "Image Analysis for Quantitation of Estrogen Receptor in Formalin-Fixed Paraffin-Embedded Sections of Breast Carcinoma", *Modern Pathology*, vol. 4, No. 1, pp. 91-95, 1991.

Baer, et al., "Stochastic Models of Local Structures Versus Global Atomic Configurations", *Journal of Non-Crystalline Solids*, vols. 192 and 193, pp. 106-110, 1995.

Ballard, et al., *Computer Vision*, Prentice-Hall, Inc., Englewood Cliffs, New Jersey, USA, pp. 65-70; pp. 149-165, 1982.

Bander, "Monoclonal Antibodies to Renal Cancer Antigens", *European Urology*, vol. 18, No. 2, pp. 10-12, Aug. 1990.

Baxes, *Digital Image Processing Principles and Applications*, John Wiley & Sons, Inc., pp. 127-137.

Castleman, *Digital Image Processing*, Prentice Hall, Upper Saddle River, New Jersey, pp. 452-460; 551-554, 1996.

Caulet, et al., "Comparative Quantitative Study of Ki-67 Antibody Staining in 78B and T Cell Malignant Lymphoma (ML) Using Two Image Analyser Systems", *Path. Res. Pract.*, vol. 188, pp. 490-496, 1992.

Ceriani, et al., "Circulating human mammary epithelial antigens in breast cancer", *Proc. Natl. Acad. Sci.*, vol. 79, pp. 5420-5424, Sep. 1998.

Ceriani, et al., "Surface differentiation antigens of human mammary epithelial cells carried on the human milk fat globule", *Proc. Natl. Acad. Sci.*, vol. 74, No. 2, pp. 582-586, Feb. 1977.

ChromaVision, "Products", http://www/chromavision.com/products/index.htm, 2004.

Ciocca, et al., "Immunohistochemical Detection of an Estrogen-regulated Protein by Monoclonal Antibodies", *Cancer Research*, vol. 42, pp. 4256-4258, Oct. 1982.

Colcher, et al., "A spectrum of monoclonal antibodies reactive with human mammary tumor cells", *Proc. Natl. Acad. Sci.*, vol. 78, No. 5, pp. 3199-3203, May 1981.

Cote, et al., "Prediction of Early Relapse in Patients with Operable Breast Cancer by Detection of Occult Bone Marrow Micrometastases", *Journal of Clinical Oncology*, vol. 9, No. 10, pp. 1749-1756, Oct. 1991.

Cuttitta, et al., "Monoclonal antibodies that demonstrate specificity for several types of human lung cancer", *Proc. Natl. Acad. Sci.*, vol. 78, No. 7, pp. 4591-4595, Jul. 1981.

Diamond, et al., "Computerized Image Analysis of Nuclear Shape as a Prognostic Factor for Prostatic Cancer", *The Prostate*, vol. 3, pp. 321-332, 1982.

Diel, et al., "Monoclonal Antibodies to detect breast cancer cells in bone marrow", Accession No. 94266290, *Important Advances in Oncology*, pp. 143-164, 1994, Abstract.

Dippold, et al., "Cell surface antigens of human malignant melanoma: Definition of six antigenic systems with mouse monoclonal antibodies", *Proc. Natl. Acad. Sci.*, Vol. 77, No. 10, pp. 6114-6118, Oct. 1980.

Drobnjak, et al., "Immunocytochemical Detection of Estrogen and Progesterone Receptors (ER/PR) in Paraffin Sections of Human Breast Carcinoma, Correlation with Biochemical Analysis and Automated Imaging Quantitation", *Laboratory Investigation, a Journal of The United States and Canadian Academy of Pathology, Inc.*, Annual Meeting, Chicago, Illinois, Mar. 17-22, 1991.

Duda, et al., *Pattern Classification and Scene Analysis*, John Wiley & Sons, pp. 228-239; 276-284, 1973.

Enestrom, et al., "Quantitative Ultrastructural Immunocytochemistry Using a Computerized Image Analysis System", *Stain Technology*, vol. 65, No. 6, pp. 263-278, 1990.

Esteban, et al., "Quantification of Estrogen Receptors on Paraffin-Embedded Tumors by Image Analysis", *Modern Pathology*, vol. 4, No. 1, pp. 53-57, Jan. 1991.

Foster, et al., "Monoclonal Antibodies to the Human Mammary Gland", *Virchows Arch (Pathol. Anat.)*, vol. 394, pp. 279-293, 1982.

Freedman, et al., "B-Cell Monoclonal Antibodies and Their Use in Clinical Oncology", Accession No. 91191374, *Cancer Investigation*, vol. 9, No. 1, pp. 69-84, 1991, Abstract.

Goldschmidt, et al., "Automated Immunohistochemical Estrogen Receptor Staining and Computerized Image Analysis-Comparison with Biochemical Methods".

Gong, et al., "Prostate-specific membrane antigen (PSMA)-specific monoclonal antibodies in the treatment of prostate and other cancers", Accession No. 2000312481, *Cancer and Metastasis Reviews*, vol. 18, No. 4, pp. 483-490, 1999, Abstract.

Greene, "Monoclonal Antibodies to human estrogen receptor", *Proc. Natl. Acad. Sci.*, vol. 77, No. 9, pp. 5115-5119, Sep. 1980.

Gross, et al., "Quantitative Immunocytochemistry of Hypothalamic and Pituitary Hormones", *The Journal of Histochemistry and Cythochemistry*, vol. 33, No. 1, pp. 11-20, 1985.

Hartelius K., et al. "Bayesian Grid Matching" Institute of Mathematical Modeling Technical University of Denmark (Nov. 22, 2000).

Herlyn, M., et al., "Colorectal carcinoma-specific antigen: Detection by means of monoclonal antibodies," *Proc. Natl. Acad. Sci.*, U.S.A., vol. 76, pp. 1438-1442, 1979.

Horsfall, D.J. et al., "Immunocytochemical assay for oestrogen receptor in fine needle aspirates of breast cancer by video image analysis", *Br. J. Cancer*, 59, 129-134, 1989.

Janeway, C.A., et al., "Immunobiology," The Immune System in Health and Disease *Current Biology Ltd.*, Garland Publishing Inc., pp. 2:3-2:5, 1994.

Kerns, B.J. et al., "Estrogen receptor status evaluated in formalin-fixed paraffin embedded breast carcinomas determined by automated immunohistochemistry and image analysis", *Proceedings of the American Association for Cancer Research*, vol. 35, Mar. 1994.

Kohler, C. et al., "Continuous cultures of fused cells secreting antibody of predefined specificity," *Nature*, vol. 256, pp. 495-497, 1975.

Kohler, C., et al., "Derivation of specific antibody-producing tissue culture and tumor lines by cell fusion," *Eur. J. Immunol.*, vol. 6, pp. 511-519, 1976.

Lastoria, S. et al., "Management of patients with ovarian cancer using monoclonal antibodies", Accession No. 93313141, *Biomedicine and Pharmacotherapy*, vol. 46, No. 10, pp. 453-63, 1992, Abstract.

Ledley, R.S. et al., "Fundamentals of True-Color Image Processing", *IEEE*, pp. 791-795, 1990.

Levine, Gary M. et al., "Quantitative Immunocytochemistry by Digital Image Analysis: Application to Toxicologic Pathology", *XICOLOGIC Pathology* ISSN:0192-6233, vol. 15, No. 3, pp. 303-307, 1987.

Lin, C.W. et al., Detection of exfoliated bladder cancer cells by monoclonal antibodies to tumor-associated cell surface antigens, Accession No. 91162409, *Journal of Occupational Medicine*, vol. 32, No. 9, pp. 910-916, Sep. 1990. Abstract.

Mansi, J.L., et al., "Bone Marrow Micrometastases in Primary Breast Cancer: Prognostic Significance After 6 Years' Follow-Up," *Eur. J. Cancer*, vol. 27, No. 12, pp. 1552-1555, 1991.

Martin, V. M., et al., "Immunomagnetic enrichment of disseminated epithelial tumor cells from peripheral blood by MACS," *Experimental Hematology*, vol. 26, pp. 252-264.(1998).

Maudelonde, T. et al., "Immunostaining of Cathepsin D in Breast Cancer: Quantification by Computerised Image Analysis and Correlation with Cytosolic Assay", *Eur. J. Cancer*, vol. 28A, No. 10, pp. 1686-1691, 1992.

McClelland, Richard A. et al., "Automated Quantitation of Immunocytochemically Localized Estrogen Receptors in Human Breast Cancer", Cancer Research 50, 3545-3550, Jun. 1990.

McClelland, Richard A., et al., "A Multicentre Study into the Reliability of Steroid Receptor Immunocytochemical Assay Quantification", *The European Journal of Cancer*, vol. 27, No. 6, pp. 711-715, Jun. 1991.

McGee, J O'D. et al., "A new marker for human cancer cells. 2. Immunohistochemical detection of the Ca antigen in human tissues with the Ca1 antibody," *The Lancet*, vol. 2, pp. 7-11, Jul. 3, 1982.

McKeough et al., "A Low-Cost Automatic Translation and Autofocusing System for a Microscope", *Measurement Science and Technology*, IOP Publishing, Bristol, GB, vol. 6, No. 5, pp. 583-587, May 1995.

Mize, R. Ranney et al., "Quantitative immunocytochemistry using an image analyzer. I. Hardware evaluation, image processing, and data analysis", *Journal of Neuroscience Methods*, vol. 26, pp. 1-24, 1988.

Moss, T.J., et al., "Prognostic Value of Immunocytologic Detection of Bone Marrow Metastases in Neuroblastoma," *The New England Journal of Medicine*, vol. 324, No. 4, pp. 219-226, Jan. 1991.

Nadler, L.M. et al., "A monoclonal antibody defining a lymphoma-associated antigen in man," J. Immunol., vol. 125, No. 2, pp. 570-577, 1980.

Naume, B., et al., "Immunomagnetic techniques for the enrichment and detection of isolated breast carcinoma cells in bone marrow and peripheral blood," *J. of Hematotherapy*, vol. 6, pp. 103-114, 1997.

Neame, P.B. et al., "The use of monoclonal antibodies and immune markers in the diagnosis, prognosis, and therapy of acute leukemia", Accession No. 94184108, *Transfusion Medicine Reviews*, vol. 8, No. 1, pp. 59-75, Jan. 1994. Abstract.

Neville, A.M., "Detection of tumor antigens with monoclonal antibodies", Accession No. 92096159, *Current Opinion in Immunology*, vol. 3, No. 5, pp. 674-678, Oct. 1991. Abstract.

Nuti, M. et al., "A monoclonal antibody (B72.3) defines patterns of distribution of a novel tumor-associated antigen in human mammary carcinoma cell populations", *Int. J. Cancer*, vol. 29, pp. 539-545, 1982.

Poynton, Frequently asked questions about color, www.inforamp.net/~poynton, pp. 1-24, Dec. 30, 1999.

Pratt, William K., *Digital Image Processing, 2nd Edition*, A Wiley-Interscience Publication, 1991.

Press, Michael F. et al., "Her-2/nue Expression in Node-negative Breast Cancer: Direct Tissue Quantitation by Computerized Image Analysis and Association of Overexpression with Increased Risk of Recurrent Disease", *Cancer Research*, vol. 53, pp. 4960-4970, Oct. 1993.

Price, J.O., et al., "Prenatal Diagnosis with Fetal Cells Isolated from Maternal Blood by Multiparameter Flow Cytometry," *AM. J. Obstet. Gynecol.*, vol. 165, pp. 1731-1737, Dec. 1991.

Price, M.R. et al., "Summary report on the ISOBM TD-4 Workshop: analysis of 56 monoclonal antibodies against the MUC1 mucin" Accession No. 1998084002, San Diego, CA, Nov. 17-23, 1996, *Tumour Biology*, vol. 19, Suppl. 1, pp. 1-20, 1998. Abstract.

Roca et al., "New Autofocusing Algorithm for Cytological Tissue in a Microscopy Environment", *Optical Engineering, Soc. of Photo-Optical Instrumentation Engineers*, Bellingham, US, vol. 37, No. 2, pp. 635-641, Feb. 1, 1998.

Russ, John C., *Image Processing Handbook, 2nd Edition*, Library of Congress Cataloging-in-Publication Data, 1995.

Scheinberg, D.A., "Monoclonal antibodies in the treatment of myelogenous leukemias", Accession No. 93199942, *Cancer Treat. and Res.*, vol. 64, pp. 213-232, 1993. Abstract.

Schultz, Daniel S., et al., "Comparison of Visual and CAS-200 Quantitation of Immunocytochemical Staining in Breast Carcinoma Samples", *Analytical and Quantitative Cytology and Histology*, vol. 14, No. 1, pp. 35-40, Feb. 1992.

Sell, S., "Cancer markers of the 1990s", Accession No. 90235478, *Clinics in Lab. Med.*, vol. 10, No. 1, pp. 1-37, Mar. 1990. Abstract.

Seregni, E. et al., "Mucinic tumor markers recognized by monoclonal antibodies", Accession No. 91217796, *J. Nuc. Med. and Allied Sci.*, vol. 34, No. 4, pp. 314-320, Oct.-Dec. 1990. Abstract.

Simpson, J.L. and Elias, S., "Isolating Fetal Cells From Maternal Blood—Advances in Prenatal Diagnosis Through Molecular Technology," *JAMA*, vol. 270, No. 19, pp. 2357-2361, Nov. 17, 1993.

Taylor-Papadimitriou, J. et al., "Monoclonal antibodies to epithelium-specific components of the human milk fat globule membrane: production and reaction with cells in culture," *Int. J. Cancer*, vol. 28, pp. 17-21, 1981.

Tyer, C.L., et al., "Breast cancer cells are effectively purged from peripheral blood progenitor cells with an immunomagnetic technique," *Clinical Cancer Research*, vol. 2, pp. 81-86, 1996.

Unnerstall, James R. et al., "New Approaches to Quantitative Neuropathology: Multtivariate Analysis of Morphologic and Neurochemical Measures", *Neurobiology of Aging*, vol. 8, pp. 567-569, Pergamon Journals Ltd., 1987.

Vaickus, L. et al., "Overview of monoclonal antibodies in the diagnosis and therapy of cancer", Accession No. 91322684, *Cancer Investigation*, vol. 9, No. 2, pp. 195-209, 1991. Abstract.

Vangsted, A.J., et al., "Monoclonal antibodies for diagnosis and potential therapy of small cell lung cancer—the ganglioside antigen fucosyl-GM1", Accession No. 94137489, *Acta Oncologica*, Vo 32, No. 7-8, pp. 845-851, 1993. Abstract.

Wallace, The JPEG Still Picture Compression Standard, IEEE Transactions on Consumer Electronics, vol. 38, No. 1, pp. xviii-xxxiv, Feb. 1992.

Wikstrand, C.J. and Bigner, D.C., "Expression of human fetal brain antigens by human tumors of neuroectodermal origin as defined by monoclonal antibodies," *Cancer Res.*, vol. 42, No. 1, pp. 267-275, Jan. 1982.

\* cited by examiner

Anchor zelle 710

North zelle 730
Anchor zelle 710
East zelle 715
West zelle 725
South zelle 720

North zelle 730
Northeast zelle 735
West zelle 725
East zelle 715
South zelle 720
Anchor zelle 710

Northwest zelle 750
Northeast zelle 735
Southwest zelle 745
Southeast zelle 740

Zelle 760 (×10)

SYSTEM AND METHOD OF REGISTERING FIELD OF VIEW

TECHNICAL FIELD

This disclosure relates to a system for and method of registering images captured by a computer-controlled microscope and, more particularly, this disclosure relates to optimizing the alignment of smaller fields of view captured by a computer-controlled automated microscope into larger fields of view.

BACKGROUND

In the field of anatomic pathology, a piece of human tissue is typically inspected and analyzed by marking a sample with a stain that reveals a visual indicator of diagnostic significance and then placing the stained tissue on a slide for viewing under a microscope. Automated imaging systems exist today that capture microscopic image data using a scanning instrument, such as a digital camera in combination with a computer-controlled microscope. Capturing areas of the slide sample at high magnification is necessary for examining minute features of the tissue. A single image of an entire tissue specimen at a high magnification such as 40× requires significant computer storage space and involves lengthy retrieval times. Alternatively, by collecting and storing the sample as any number of contiguous micro images at high objectives, the system can perform various compression techniques and make improvements to data acquisition, retrieval, display, and storage of the images.

A challenge relating to microscopy for anatomic pathology involves assembling micro images captured at high magnifications into a variety of fields of view. This could include a composite image of the entire slide sample or a field of view spanning any portion of the specimen. For example, U.S. Pat. No. 6,404,906, entitled, "Method and apparatus for acquiring and reconstructing magnified specimen images from a computer-controlled microscope," describes a method of using a computer-controlled microscope system to provide a reconstructed, seamless image from several contiguous fields of view to show the architecture and spatial relationship of biological material in a specimen. A macro image of contiguous image titles at a low magnification and optical resolution is obtained, and the user navigates within the macro image and selects areas. Higher magnification titles for the selected area are assembled and viewed at a higher magnification and optical resolution as a composite micro image of the selected area. Both the macro and micro images may be displayed simultaneously. Preferably, the user may scroll and cause additional fields of view to be added to previously displayed fields of view.

While the '906 patent provides a means of reconstructing micro images into other fields of view, it does not ensure that the system captured the expected image in the first place, nor does it explain what to do if image capture was imprecise. Calibration of such a system is frequently performed, but it is still unfeasible to account for every minor inaccuracy when working with images at very high magnification levels. One example of a calibration inaccuracy in the system might occur while moving the turret from one microscopic image to another. Because this process involves mechanical precision in measurements of microns, a slightly different image from what was expected may be captured. As a result, significant tissue samples may be overlooked. In addition, visible discontinuities may exist for any macro image including micro images where capture was inaccurate. What is needed is a means of seamlessly aligning microscopic images into larger fields of view.

Furthermore, if image capture by an automated microscope system is consistently inaccurate, this may indicate a need to calibrate the system. By analyzing the offset of each image, the system may be able to determine the variable by which inaccuracy is occurring. What is needed is a means of distinguishing between reasonable system inaccuracies and recurring system inaccuracies.

SUMMARY

Disclosed is a method of registering images captured by a computer controlled microscope. The method includes the steps of partitioning a microscopic image into a series of segments, wherein each segment comprises a discrete portion of the microscopic image; capturing image data for each of the segments, wherein the image data for each segment includes at least one duplicate region of image data that overlaps with the image data of an adjacent segment; determining an anchor segment by which all adjacent segments will be compared; and aligning the segments with one another to create a single macroscopic image comprised of the aligned segments. In one embodiment, the microscopic image relates to an image of a microscope slide having a biological sample and each segment is classified as either an interesting segment that contains at least a portion of the sample, or a nonintersecting segment that contains none of the sample.

For each segment, a correlation score is calculated indicative of the level of correlation of the segment with each of its adjacent segments. The correlation score is calculated by correlating the duplicate region of the segment to a corresponding duplicate region of an adjacent segment. Furthermore, at least one offset value is calculated relative to an adjacent segment. The offset value is indicative of the amount that the segment is offset relative to the adjacent segment. The correlation score and offset values are used to align adjacent segments to one another.

Also disclosed is a computer program on computer readable medium comprising instructions to cause a computer to partition a microscopic image into a series of segments, wherein each segment comprises a discrete portion of the microscopic image; capture image data for each of the segments, wherein the image data for each segment includes at least one duplicate region of image data that overlaps with the image data of an adjacent segment; determine an anchor segment by which all adjacent segments will be compared; and align the segments with one another to create a single macroscopic image comprised of the aligned segments.

Also disclosed is a microscope imaging system comprising a computer, which comprises a system processor and a computer program on computer readable medium. The computer program comprises instructions to cause the computer to partition a microscopic image into a series of segments, wherein each segment comprises a discrete portion of the microscopic image; capture image data for each of the segments, wherein the image data for each segment includes at least one duplicate region of image data that overlaps with the image data of an adjacent segment; determine an anchor segment by which all adjacent segments will be compared; and align the segments with one another to create a single macroscopic image comprised of the aligned segments.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Disclosed is a system for and a method of registering images captured by a computer-controlled microscope. The system and method can be used to capture a macro image of a tissue specimen, wherein the image is comprised collection of seamlessly-aligned microimages and wherein positioning inaccuracies that would prevent the omission of interesting sample image content are eliminated. The disclosed system and method also identifies possible calibration inaccuracies in an automated microscope system. In one aspect, the imaging system of the present invention divides a microscopic image into a plurality of regions, including interesting and non-interesting regions. Next, the system identifies only interesting regions of the microscopic image. The system then captures image data for each interesting region, wherein the image data for each region includes data that overlaps with an adjacent region. The system then determines an anchor region by which all adjacent regions will be compared. Each region is then aligned to create one seamless macroscopic image.

Figure 1A:
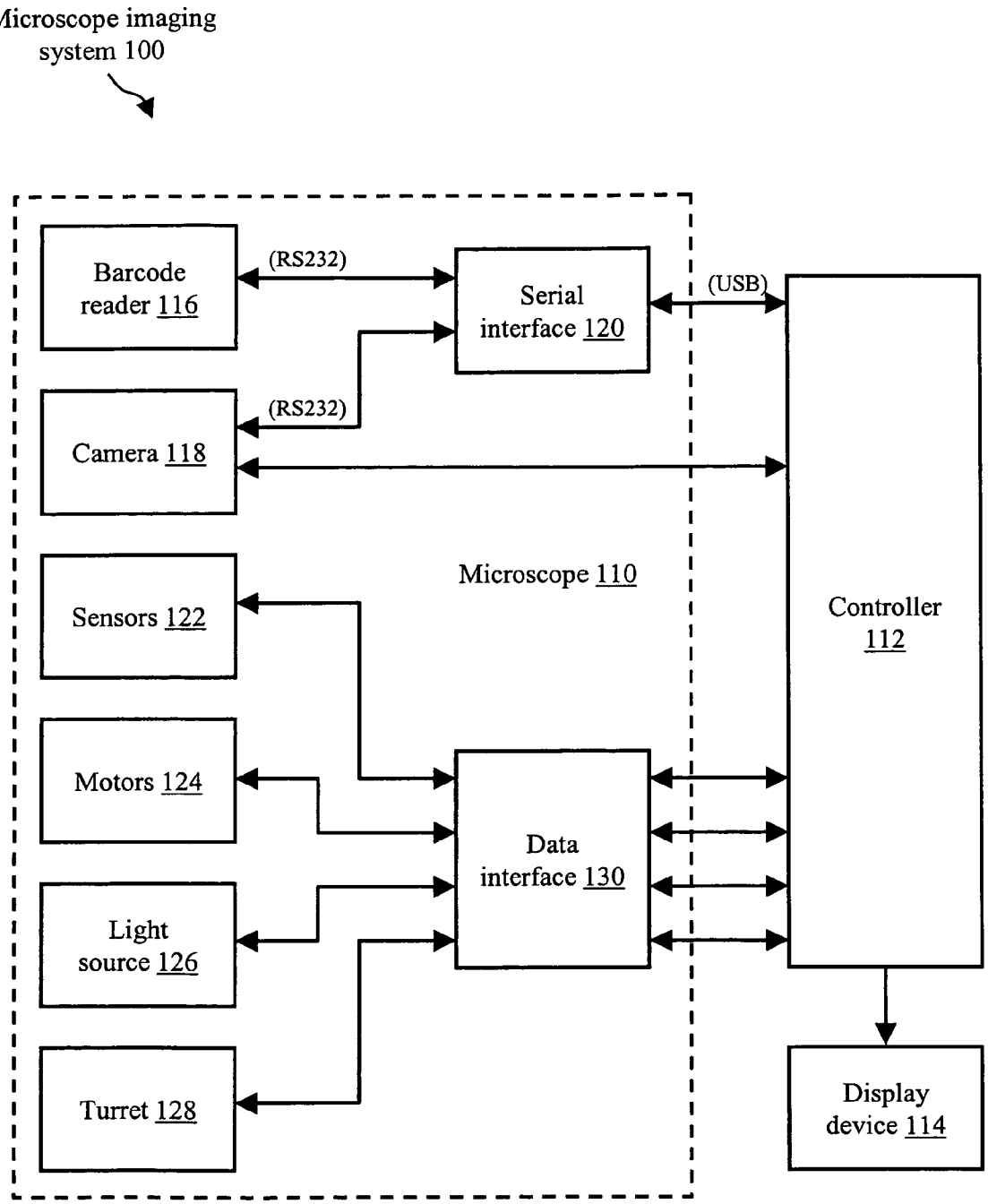
FIG. 1A illustrates a high-level functional diagram of a microscope imaging system in accordance with the invention.

FIG. 1A illustrates an exemplary high-level functional diagram of a microscope imaging system 100 configured in a manner that can be used to effect the disclosed systems and methods. The microscope imaging system 100 includes a microscope 110 electrically connected to a controller 112 having a display device 114. The controller 112 in FIG. 1A can be any special-purpose or conventional computer, such as a desktop, laptop, or host computer. The controller 112 is loaded with the appropriate software for controlling microscope imaging system 100, such as software for running image-processing algorithms and image analysis algorithms. The display device 114 can be any special-purpose or conventional computer display device that outputs graphical images to a user.

In one embodiment, the microscope 110 is a computer-controlled microscope suitable for use in an automated imaging system. In one embodiment, the microscope 110 is a ChromaVision Automated Cellular Imaging System (ACIS). The microscope 110 further includes a barcode reader 116, a camera 118, a serial interface 120, one or more sensors 122, one or more motors 124, a light source 126, a turret 128, and a data interface 130, each of which is described further below.

Figure 2:
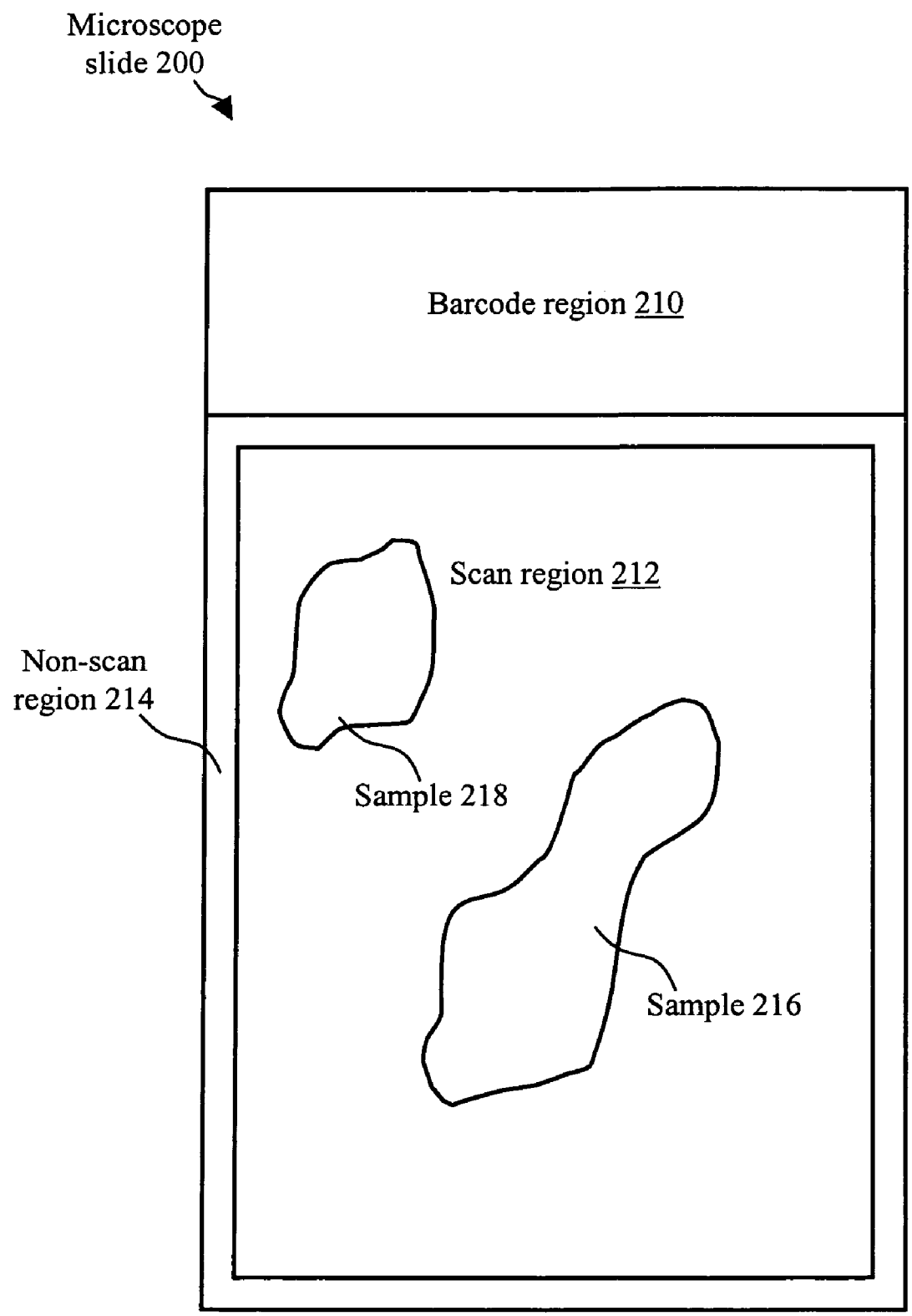
FIG. 2 illustrates a conventional microscope slide for use within the microscope imaging system.

The barcode reader 116 is a standard barcode reader capable of detecting an identifier located on, in the example of microscope imaging system 100, a standard microscope slide, as described in more detail in reference to FIG. 2. The barcode reader 116 can also comprise any type of device that can read and/or categorize an identifier located on the microscope slide.

The camera 118 can be a digital camera having selectable resolution capabilities. Furthermore, the camera can comprise any type of device suitable for gathering an image. The camera 118 is mounted upon a turret 128 of the microscope 110 such that an aperture of the camera 118 is aligned with the field of view (FOV) of any lens associated with the turret 128. The barcode reader 116 and the camera 118 are electrically coupled to a serial interface such that they can feed electrical inputs to a serial interface 120, which facilitates a serial communication link between the camera 118 and the barcode reader 116 and the controller 112. In one embodiment, the serial interface 120 provides a USB connection to controller 112. It should be appreciated that the camera 118 and the barcode reader 116 can be communicatively coupled to the controller 112 in other manners.

The controller 112 can include one or more components for facilitating its functions. In one embodiment, the controller includes a video card (not shown). The camera 118 provides a direct video output to the video card within the controller 112. The video card gathers the image data from camera 118 for processing in a well-known manner.

With reference still to FIG. 1A, the sensors can include one or more sensors for sensing various aspects of the imaging system 100. For example, the sensors 122 include, but are not limited to, position sensors, temperature sensors, and light intensity sensors or optical encoders. The motors 124 can be any type of motors for providing motion to the microscope or any portion of the microscope. In one embodiment, the motors 124 are conventional servomotors associated with the motion control of microscope 110, such as those for rotating the appropriately powered lens within the optical path of microscope 110, for adjusting focus, or for controlling an automated X, Y stage (shown in FIG. 1B).

The light source 126 can be any suitable light source for appropriately illuminating the FOV of microscope 110 sufficient to create a digital image of that FOV. The turret 128 is a conventional motor-driven microscope turret upon which is mounted a set of lenses of varying power that may be rotated into the optical path of the microscope 110. The turret 128 is also suitably controlled to provide the desired focus. The sensors 122, motors 124, light source 126, and turret 128 feed to the electrical inputs of the data interface 130. The data interface 130 can be a conventional system driver card, which facilitates a data communication link between these elements and a motion control card (not shown) within the controller 112.

Figure 1B:
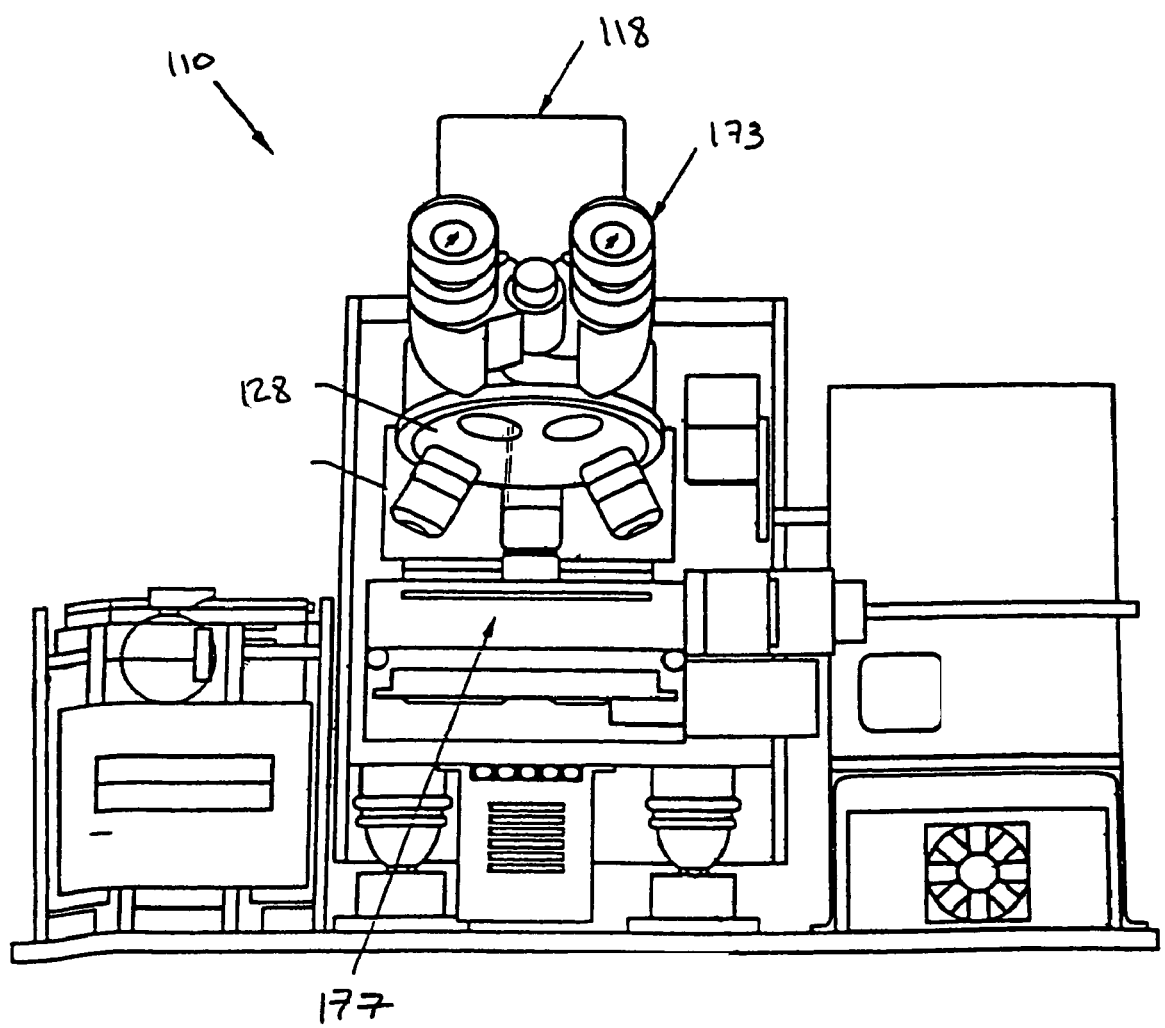
FIG. 1B illustrates a front view of an exemplary microscope.

FIG. 1B shows a front view of an exemplary microscope 110. A set of viewing oculars 173 of the microscope 110 are optionally located on the microscope 110 for operator viewing. As mentioned, the microscope 110 further includes a camera 118 for acquiring images. An automatic slide in-feed stage (not shown) in conjunction with an X-Y stage 177 provide automatic slide handling in the apparatus. The illumination light source 126 (not shown in FIG. 1B) projects light onto the X-Y stage 177, which is subsequently imaged through the microscope 110 and acquired through the CCD camera 118 for processing in an image processor. A Z stage or focus stage 179 under control of the microscope controller 112 provides displacement in the Z plane for focusing. The microscope 110 further includes the motorized objective turret 128 for selection of objectives.

With reference now to FIGS. 1A and 1B, the generalized operation of microscope imaging system 100 is now described. In an initial operation, one or more standard microscope slides having at least one biological sample deposited thereon and stained with one or more chromogenic dyes is fed to the automated X-Y stage 177 of the microscope 110. Each slide is fed via an in-feed stage (not shown) and subsequently is positioned in the FOV of microscope 110. Additionally, as each slide transitions from the in-feed stage of the microscope imaging system 100 to the X, Y stage of the microscope 110, an identifier of the target microscope slide is read by barcode reader 116 or is identified in another manner.

Once the slide is positioned in the FOV of the microscope 110, an image scan operation is performed wherein the slide is scanned at a various resolutions and magnifications based upon image-processing algorithms and image analysis algorithms executed by the controller 112. Upon completion of the image scan operation, the slide is transferred out of microscope imaging system 100 via an out-feed stage of the system. Furthermore, the slide ID and image data for that particular slide is transmitted to controller 112 and stored in memory. The motion control system then moves the next target slide into the FOV of the microscope 110. The aforedescribed process automatically repeats for each microscope slide that is automatically fed into microscope imaging system 100.

It should be appreciated that the microscope imaging system 100 can be configured to operate autonomously. That is, a clinician can initiate the microscope imaging system 100 such that the microscope imaging system 100 thereafter operates automatically without the need for human intervention as long as a supply of microscope slides is available at its in-feed stage and no system errors occur. At any time during the process, however, a clinician may view and/or manipulate the digital image of any given slide via controller 112 and display device 114 for the inspection and analysis of any given specimen, as is well known in anatomic pathology. This is possible because the controller 112 reconstructs the image using the image data associated with the contiguous FOVs and the image registration information. Alternately, the clinician and/or the controller can manually feed slides into the microscope imaging system.

With reference now to FIG. 2, there is shown a conventional microscope slide 200 formed of any suitable material, such as, for example, glass, for use within microscope imaging system 100. An identifier region 210 is located on the slide 200, such as at one end of microscope slide 200. A unique identifying tag is located in the identifier region 210. The identifying tag can be, for example, a barcode sticker, or any tag that can be used to identify the slide 200. The microscope slide 200 further includes a scan region 212, which is at least partially surrounded by a non-scan region 214. The scan region 212 represents a predetermined preliminary region of the slide 200 to be scanned. At least one sample, such as a sample 216 and a sample 218, are likely to be entirely or partially located within the scan region 216. The samples 216 and 218 are representative of any target specimen, such as, for example, a tissue sample resulting from a needle biopsy. The non-scan region 214 is the remaining area (excluding the scan region 216) along the edge of the microscope slide 200, within which it is unlikely that any sample is located. Consequently, the non-scan region 214 need not be scanned by the microscopic imaging system 100.

Figure 3:
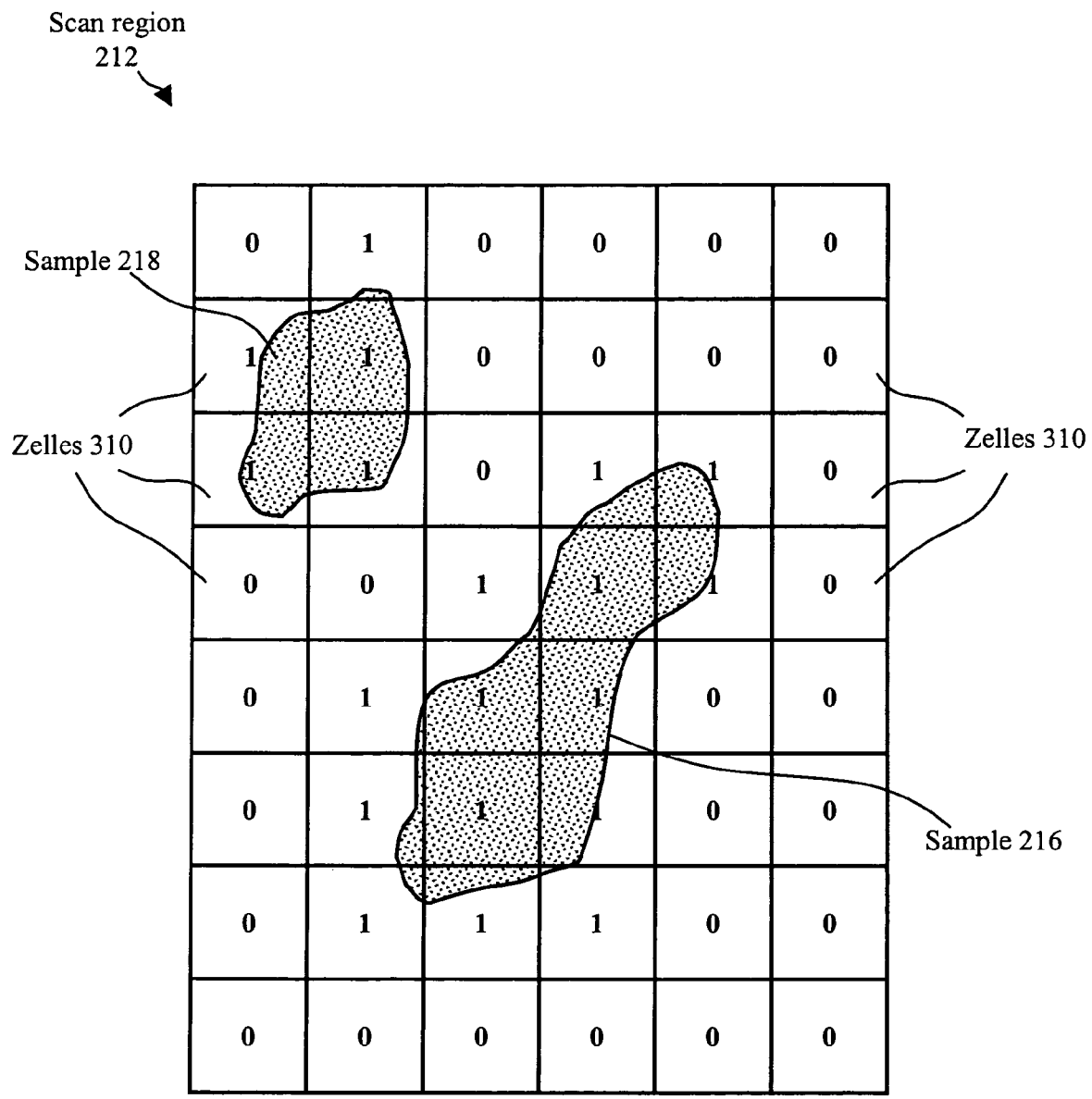
FIG. 3 illustrates an expanded view of a scan region of the microscope slide during the automated image scanning operation.

FIG. 3 illustrates an expanded view of the scan region 212 of the microscope slide 200 during the automated scanning operation of the microscope imaging system 100. The scan region 212 is partitioned into an array of contiguous segments, or zelles 310. Each zelle 310 covers a discrete portion of the scan region 212 and all the zelles collectively cover the entire area of the scan region 212. In one embodiment, the area of each zelle 310 is defined by the power (i.e., magnification) setting of the microscope 110. Those skilled in the art will appreciate that a microscopic FOV reduces very substantially as the magnification increases.

In one embodiment, the zelles 310 are representative of the FOVs during an image scanning operation in which low magnification and resolution are used; thus, the scan time and the amount of stored image data is minimized. Additionally, a low-power lens has a greater depth of focus, so microscope 110 can search for tissue without the steps of refocusing. The low-power lens is focused at either a best-guess plane or a plane derived from microscope calibration during the image scanning operation. Optionally, a separate low-resolution, wide-FOV camera may be used.

The controller 112 executes image-processing algorithms and image analysis algorithms to determine any regions of microscope slide 200 having content worthwhile for re-examination at a higher magnification during later scanning phases. More specifically, the controller 112 classifies zelles containing specimen content in one category and classifies zelles containing no specimen content in a separate category. For example, any zelle 310 found to contain specimen content is classified as "interesting" and is mapped as a logical "1", as illustrated in FIG. 3. By contrast, any zelle 310 found to have no specimen content is classified as "non-interesting" and is mapped as a logical "0." In this manner, a silhouette of each specimen, e.g., sample 216, is collectively formed by the zelles 310, thereby creating what is effectively a low-resolution image that may be processed using standard image-processing algorithms.

The parameters for analyzing each zelle 310 and determining whether there is anything of interest in each zelle 310 can be set by an operator depending on the test and application. In this way, the operator can vary how a zelle 310 will be classified. In order to efficiently perform the analysis of the zelles 310, it is desirable to avoid analyzing empty zelles 310 (i.e., zelles with no specimen content) so as to avoid unnecessarily using processing power and time of the controller 112. At the same time, there is a need to ensure that the controller does not miss any zelle 310 having mostly empty space and only a tiny segment of interest, but rather classifies such zelles as "interesting". For example, the lower, left edge (with respect to FIG. 3) of the sample 216 is partially located within a zelle and it is desirable that this zelle not be missed. Thus, a statistical algorithm is run to determine whether there is anything of interest in each zelle 310 in order to reduce the likelihood of missing any zelles with sample located therein.

The manner in which a zelle is classified as "interesting" can be unique and varied to each particular application or test. For example, a priority may be set for blue stain, red stain, any speck of tissue, or a specified large volume of tissue in order for a zelle 310 to be classified as "interesting." Consequently, the biological requirements of each particular test, as set by an operator, determine what is of interest and determine the parameters for classifying a zelle as "interesting." Therefore, each zelle 310 is analyzed using predetermined parameters for a particular test using associated algorithms that determine whether what is found in each zelle 310 matches the predetermined criteria. If what is found in a particular zelle meets the predetermined criteria, then that zelle is classified as "interesting."

Figure 4:
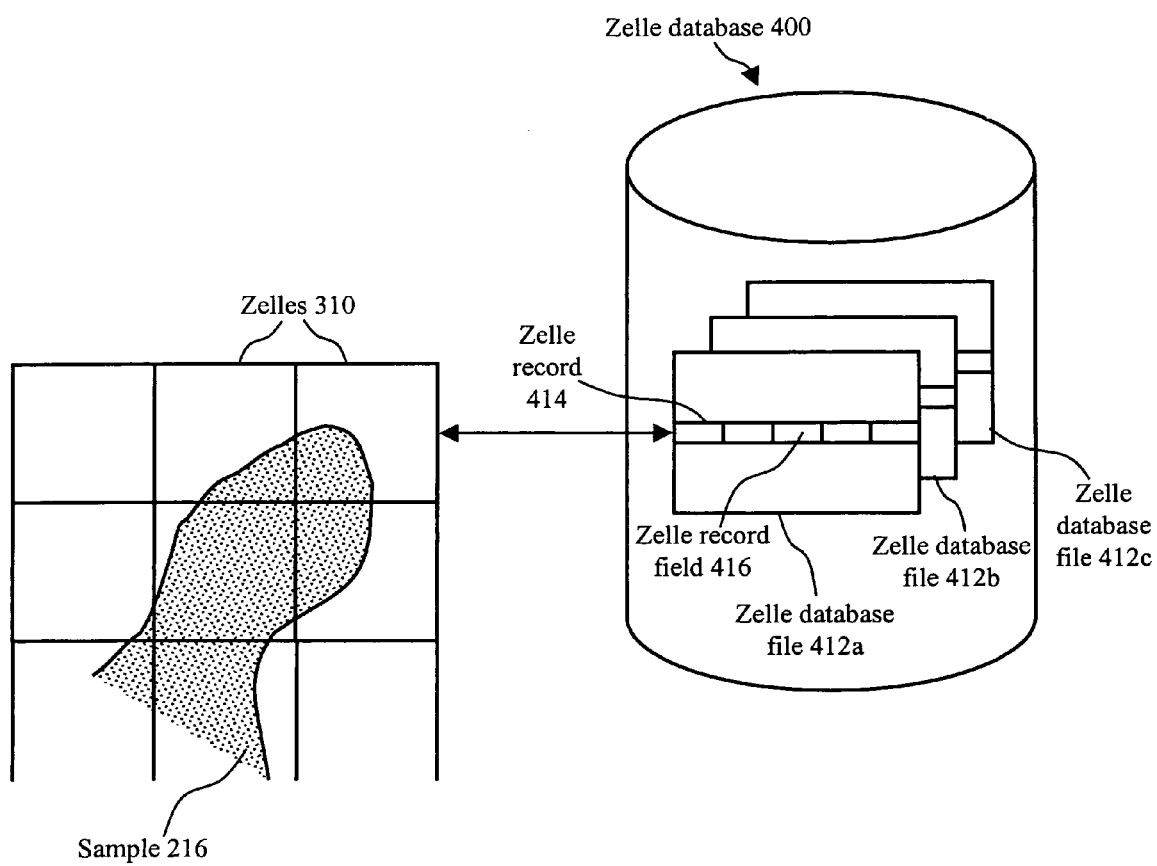
FIG. 4 illustrates a relationship between each zelle and a zelle database that includes a plurality of database files, each containing a plurality of zelle records.

With reference to FIG. 4, the zelles 310 derived from a particular sample can be stored in a database. FIG. 4 illustrates the relationship between each zelle 310 derived from, for example, the sample 216 and a zelle database 400. In one embodiment, the zelle database 400 is a non-volatile computer memory that resides on a physical hard drive (not shown) of the controller 112 of microscope imaging system 100. The zelle database 400 contains a plurality of zelle database files 412 (e.g., zelle database files 412a, 412b, and 412c in FIG. 4), wherein each zelle database file 412 contains one or more zelle records 414. Each zelle record 414 further includes a plurality of record fields 416 composed of binary digital data (not shown). In one embodiment, each zelle record 414 contains multiple zelle record fields 416 that each describe one or more individual attributes of its respective associated zelles 310. The attributes can vary and can include, for example, an identification number of scanned microscope slide 200, scale factors, the area of zelle 310, the time and date of the scan operation, the identification number of microscope imaging system 100, an image file address where the image data record for zelle 310 is stored, and a pointer to the image data record within the image file. Other useful information may also be contained in the database.

The zelle database 400 also includes placeholders for the width and height coordinates of each zelle 310. The width and height coordinates can be with respect to a coordinate system, such as a Cartesian coordinate system comprised of x and y coordinates that are oriented relative to a reference point on the slide. The process of capturing and inserting these coordinates into the zelle database 400 is referred to as the "registration" process. The registration process of these coordinates can occur either during the image capture process (referred to as "online") or after the image capture process is complete (referred to as "offline"). Ideally, each pair of adjacent zelles 310, as defined by their width and height coordinates, should align contiguously with one another if microscope 110 captures each zelle as partitioned in FIG. 3. However, due to the nature of automated microscope 110 taking images at very high magnifications, minor inaccuracies during image capture may occur. Therefore, the zelles 310 can be captured with overlapping coverage areas to make sure that no region of an image is missed due to mechanical inaccuracies in the microscope 110.

Figure 5:
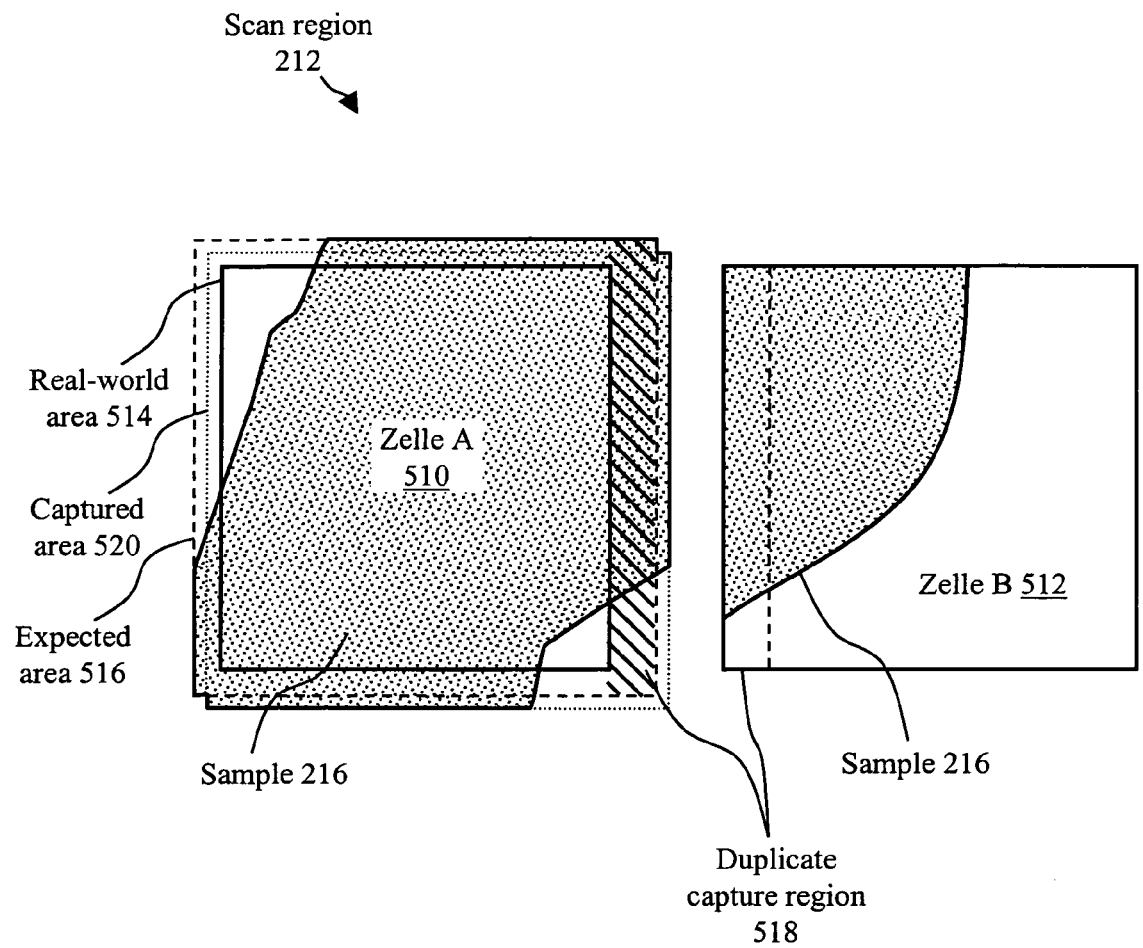
FIG. 5 illustrates a two adjacent zelles and shows both a minimum image area necessary for capture and an excess area that a microscope imaging system may capture.

FIG. 5 illustrates a first step in the aforementioned registration process. FIG. 5 shows a zelle A 510 from sample 216, which is adjacent to a zelle B 512 on the slide 200. During the process of partitioning an entire image into zelles 310 (as described above with respect to FIG. 3), the coordinates of the area of each zelle 310 as it relates to its real-world coordinates on the physical slide are identified and captured, creating a real-world area 514. For example, if the microscope slide 200 has real-world coordinates that range between 0 and 600 microns in width (x) and between 0 and 800 microns in height (y), the zelle A 510 within microscope slide 200 may have real-world coordinates x ranging, for example, between 400 and 500 microns in width and real world coordinates y ranging between 400 and 500 microns in height, given where zelle A 510 exists and how the zelle images have been partitioned within the scan region 212. The zelle B 512, which is considered a "neighbor" because it is adjacent to the right of zelle A 510, may have real-world coordinates ranging between 500 and 600 microns in width and the same 400 to 500 microns in height as zelle A 510, given that it sits directly to the right of zelle A 510 (with respect to FIG. 5).

As mentioned, for each zelle 310, the microscope 110 captures more image data than is truly necessary in order to compensate for the aforementioned inaccuracies with such a system. Because the system knows the real-world area 514 of the zelle A 510, the system can calculate an overlap or duplicate capture area for each side of zelle A 510, thus making sure that no region is missed. A duplicate capture region 518 in FIG. 5 is an example of the overlap area between neighboring zelle A 510 and zelle B 512.

The size of the duplicate capture region 518 can vary. For example, the duplicate capture region might be an extra 20 microns in width to the right of zelle A 510 and an extra 20 microns in width to the left of zelle B 512. Once the size of the duplicate capture region is determined, the system has the area that microscope 110 is commanded to capture. This is shown in FIG. 5 as an expected area 516, which includes the real-world area 514, the duplicate capture region 518, and any other additional capture regions for each side of zelle A 510. Therefore, the microscope 110 might be commanded to scan zelle A 510 at a width ranging between 380 and 520 microns and a height that might also range between 380 and 520 microns, which includes the real world width and height of the zelle A 510 plus an allowance for any duplicate capture regions. This additional capture is done for all zelles 310.

Although the microscope 110 may have been commanded to capture the expected area 516, minor inaccuracies may have caused the system to capture a slightly different image, shown as a captured area 520 in FIG. 5, which can include just a portion of the expected area 516. In fact, such inaccuracies may occur for any or all zelles 310; however, because inaccuracies occur within extra capture areas of each zelle image, the system does not miss key image data. That is, the duplicate capture regions of the zelles ensure that the system does not miss key data as a result of minor inaccuracies in the system. However, given that the expected area 516 and the captured area 520 may be different, the system may no longer understand the true coordinates of real-world area 514 as they relate to captured area 520.

Figure 6A:
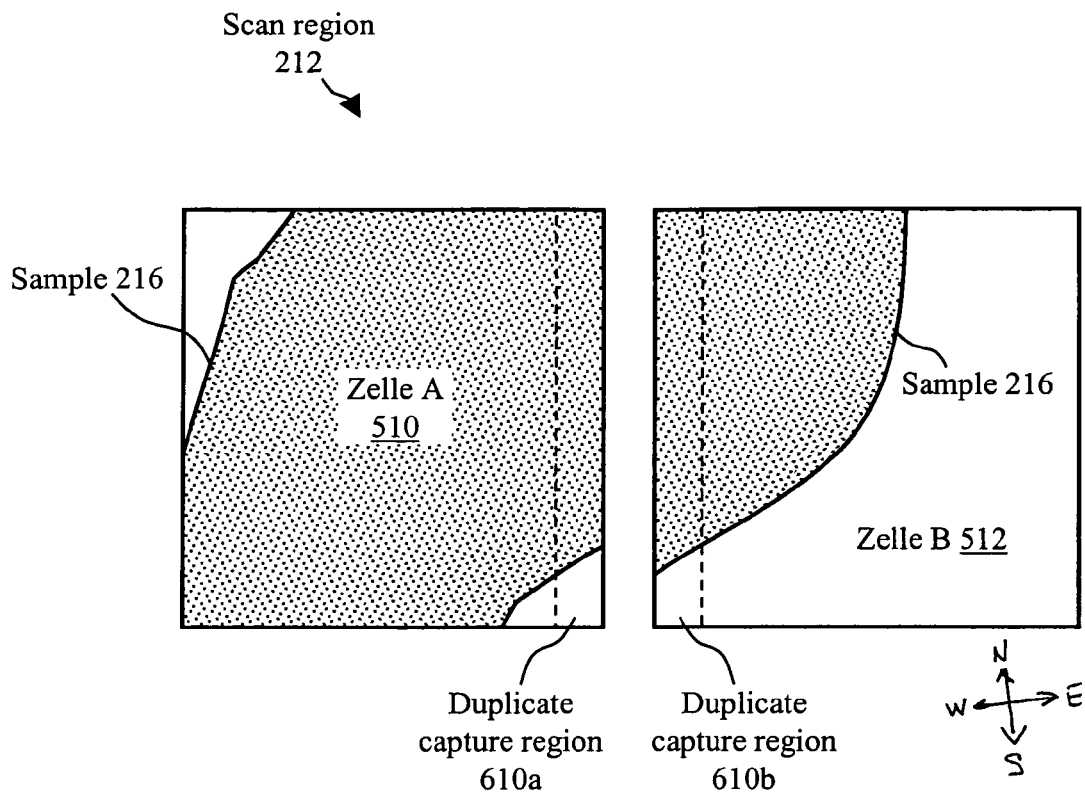
FIGS. 6A and 6B illustrate a method of image correlation for two adjacent zelles.
Figure 6B:
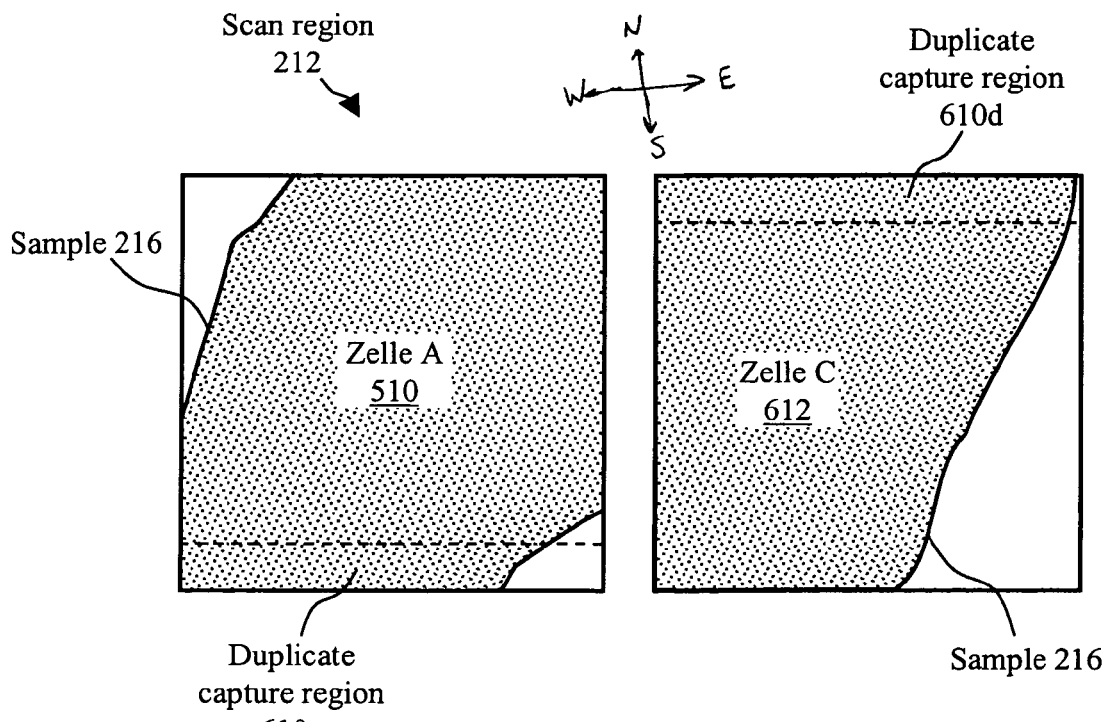

FIGS. 6A and 6B illustrate how a correlation algorithm is used to solve this problem by deriving an offset between each pair of adjacent zelles 310, wherein the offset comprises the distance by which the area of each zelle should be adjusted in order to properly align the zelles. For each of a zelle 310's neighbors to the east (E), west (W), north (N) and south (S) (with reference to the legend shown in FIGS. 6A and 6B), a duplicate capture region 518 is captured as described above with reference to FIG. 5. A standard, two-dimensional cross-correlation algorithm compares the areas of overlap between each pair of zelles 310 to determine how much the images are offset. Those skilled in the art will appreciate that, knowing a priori the intended area of overlap, the algorithm needs only to be run on this area and not run over the entirety of both images. The areas of the two duplicate capture regions 518 may be sized differently to ensure that common imagery of one zelle 310 is within the other zelle 310.

As an example, in FIG. 6A, a duplicate capture region 610a of zelle A 510 is compared with a duplicate capture region 610b of zelle B 512. In FIG. 6B, a duplicate capture region 610c of zelle A 510 is compared with a duplicate capture region 610d of a zelle C 612 using the same correlation algorithm. As a result of correlation, each zelle 310 is matched with all of its neighbors, resulting in up to four offset values for each zelle, which are stored in zelle database 400.

In addition to storing offset values, a correlation score between each pair of adjacent zelles 310 is calculated and stored, wherein the correlation score is indicative of how well the duplicate capture regions of a pair of adjacent zelles correlate to one another. For example, due to the extra white space in duplicate capture region 610c when compared with duplicate capture region 610d (shown in FIG. 6B), it appears that the algorithm will estimate a lower correlation score between zelle A 510 and zelle C 612, possibly as low as, for example, 75%. Therefore, between these two neighbors, zelle B 512 may have a higher correlation score with zelle A 510 than zelle C 612 does. This score is used during a second registration process when a single zelle 310 has conflicting offset values between two of its neighbors, which is described further in reference to FIG. 7C.

In one embodiment, the correlation algorithm has a list of at least three displacements between neighbors that are not allowed such that any neighbors violating the list do not receive a passing correlations score. These include displacements in which two neighboring zelles 310 overlap too little across X, overlap too much across X, or overlap too much across Y. Any neighbors violating such displacements do not receive a passing correlation score, even if they have a high match of offsets. Additional displacement calculations can always be used within the algorithm, and adjustments can be made to any of the allowed displacement values.

FIGS. 7A through 7F illustrate the second registration step that is performed. The second registration step occurs after image data has been captured and stored as described in FIG. 5 and offsets and correlation scores between each pair of zelles 310 have been calculated and stored as described in FIG. 6. At this point, the microscope imaging system 100 can perform a registration process that creates one contiguous image.

Figure 7A:
FIGS. 7A through 7F illustrate a composite image of a series of zelles that is assembled by first determining an anchor zelle and then aligning each adjacent neighbor zelle using offsets and correlation calculations.

FIG. 7A illustrates that microscope imaging system 100 first determines a good starting point for deciding how to piece the image together. This starting point is known as an anchor zelle 710. To determine anchor zelle 710, an algorithm is run to determine the most "connected" zelle 310. The most "connected" zelle is the zelle that has the greatest number of adjacent neighbor zelles 310 with sample content to the north, south, east, and/or west. If a zelle 310 has four adjacent neighbor zelles 310, this zelle 310 is referred to as being "four-connected". If one or more zelles 310 have an equally high number of connections, the algorithm then determines which is closest to the center of the image. These two factors determine which single zelle 310 is known as anchor zelle 710. The anchor zelle 710 could also be calculated using any other parameters. Because inaccuracies tend to build upon themselves, starting with an anchor point at a corner of the image and reconstructing the image in a raster-like pattern is not as accurate as starting with a central anchor and building the image outwards. Thus, it can be desirable for the anchor zelle to be as close to the center of the image as possible.

To register anchor zelle 710, the microscope imaging system 100 sets the original real-world area of anchor zelle 710 as the actual registered area and stores the coordinates in zelle database 400. For example, if zelle A 510 is determined to be the most appropriate anchor zelle 710, real-world area 514 becomes the registered area for zelle A 510.

Figure 7B:
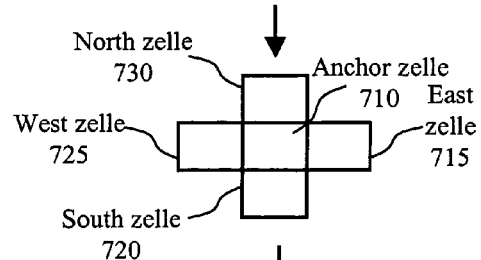

FIG. 7B illustrates the next process of, "attaching on cross" wherein neighboring zelles to the east, west, north and south (with respect to FIG. 7B) are aligned contiguously with the anchor zelle. By setting the registered positions of an east zelle 715, a south zelle 720, a west zelle 725, and a north zelle 730 according to the derived offsets each had with anchor zelle 710, as calculated by the correlation algorithm illustrated in FIG. 6, these four neighbors are aligned contiguously with anchor zelle 710.

Figure 7C:
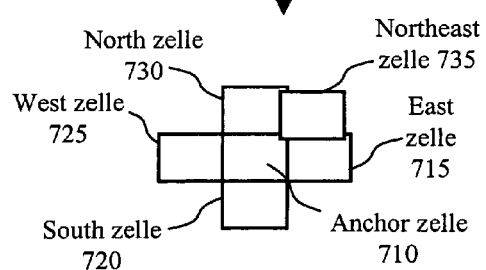

FIG. 7C illustrates the next process of "attaching on square" wherein zelles diagonal (i.e., northeast, northwest, southeast, and southwest) to the anchor zelle are aligned thereto. Unlike the process of attaching on cross, a northeast zelle 735 could potentially have matching offsets with both east zelle 715 and north zelle 730. To remedy this, the previously-calculated correlation score is used to determine which offset to use. The pair that has the highest correlation score is used in matching offsets.

Figure 7D:
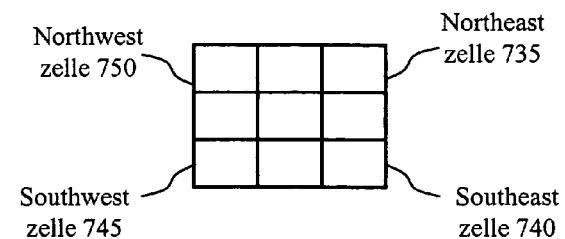
Figure 7E:
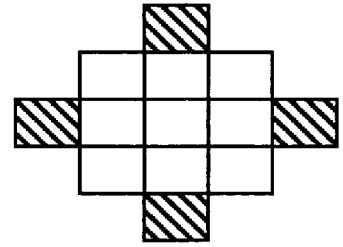
Figure 7F:
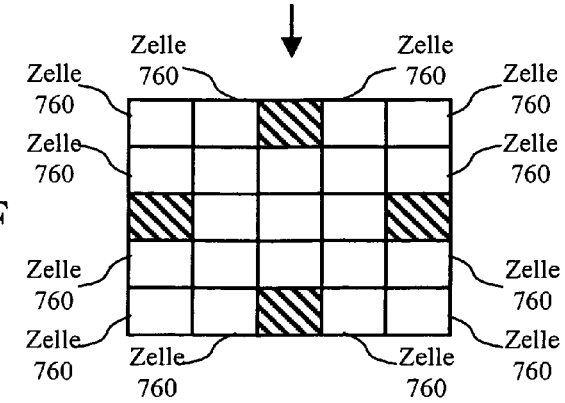

FIG. 7D shows northeast zelle 735, a southeast zelle 740, a southwest zelle 745, and a northwest zelle 750 aligning contiguously with previously registered east zelle 715, south zelle 720, west zelle 725, and north zelle 730, having performed "attaching on square" as described in reference to FIG. 7C. FIG. 7E shows that the process of "attaching on cross" is repeated, as four additional zelles 310 to the east, south, west, and north are registered relative to their neighbor zelles. It can be seen in FIG. 7E that thirteen zelles have now been aligned. The process of comparing the offsets and correlation scores of neighboring zelles is successively performed until all relevant zelles have been continuously aligned. For example, FIG. 7F shoes that the process of "attaching on square" is repeated. However, the process now compares correlation scores for determining offsets for twelve new neighbor zelles 760—three each to the northeast, southeast, southwest, and northwest. The registration process continues until all zelles 310 are registered and attached to the contiguous image.

Figure 8:
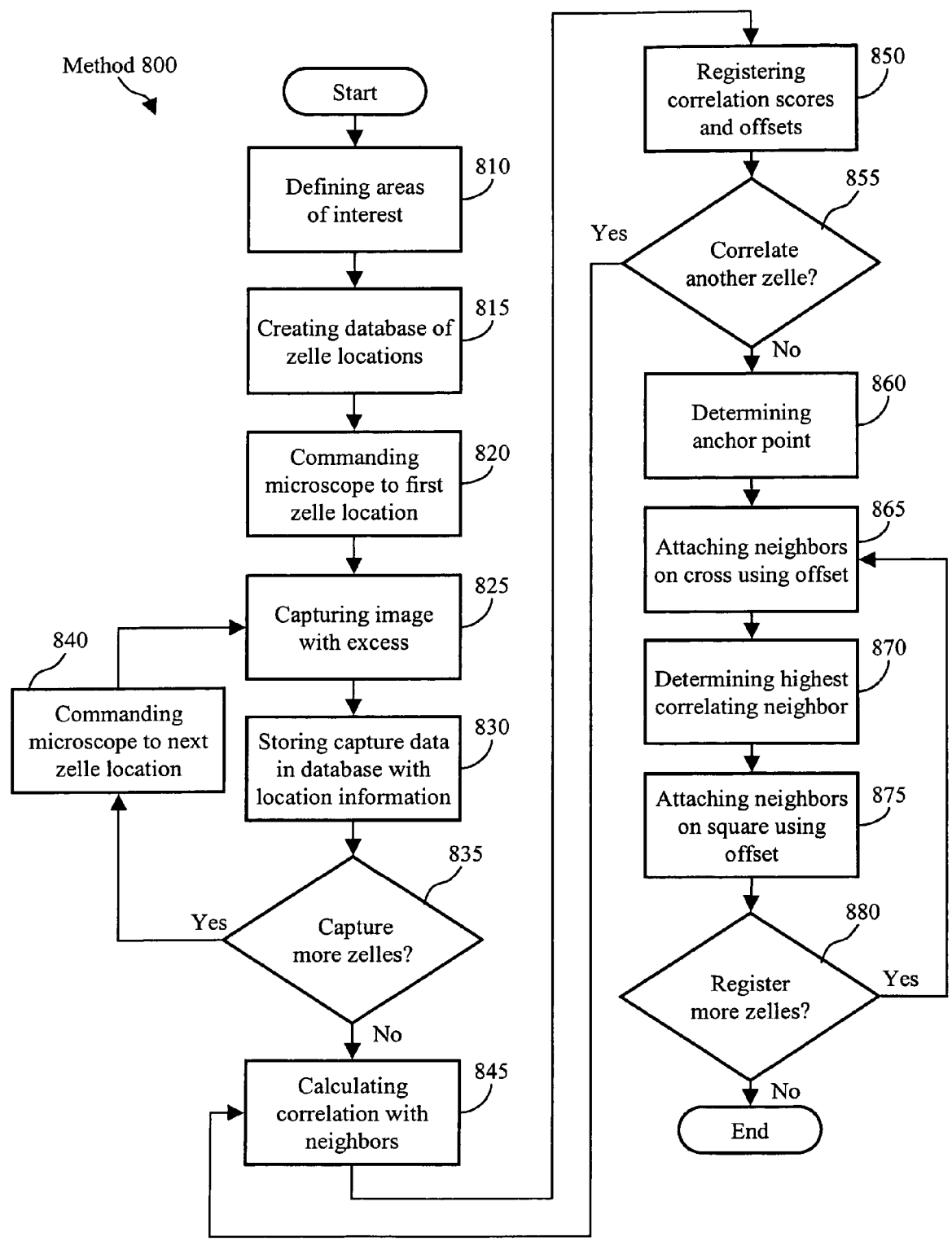
FIG. 8 illustrates a flow diagram of a method of capturing and registering microscopic images.

FIG. 8 illustrates a flow diagram of a method 800 of the entire process of capturing and registering microscopic images in accordance with the invention. The controller 112 can perform the process pursuant to instructions on a computer-readable medium. In a first operation, represented by the flow diagram box 810 in FIG. 8, the areas of interest on the slide 200 are defined. Pursuant to this step, the microscope imaging system 100 scans the microscope slide 200 at a low resolution to identify where content (such as sample 216 and sample 218 in FIG. 2) exists on the slide. The system partitions the entire image into a series of smaller segments of images called zelles 310, such as shown in FIG. 3 and described above.

The process then proceed to the operation represented by the flow diagram box 815, where a database of zelle locations is created. The coordinates of a real-world area, (such as real-world area 514 for zelle A 510 shown in FIG. 5) are logged in a zelle database 400, such as shown and described above with reference to FIG. 4. The coordinates are known because the system previously partitioned the image into these zelles 310 in the operation represented by flow diagram box 810.

The process then proceeds to the operation represented by the flow diagram box 820. Pursuant to this operation, the microscope imaging system 100 is commanded to move the FOV to the first zelle location. As discussed above, the imaging system 100 is equipped with motors 124 that can be used to move the FOV to a desired location. Once the microscope imaging system 100 is moved to the first zelle location, the process proceeds to the step represented by the flow diagram box 825, where the image is captured with excess area, as was described above with reference to FIG. 5. Specifically, the microscope imaging system 100 captures an image of a zelle 310, such as the zelle A 510 (FIG. 5) at a high resolution. This captured image includes excess image data for each side of zelle 310, wherein the excess image data comprises the previously-described duplicate capture region 518, for example.

In the next operation, the relevant data relating the zelle is captured in a database that includes location information for the zelle, as represented by the flow diagram box 830 in FIG. 8. The image data and coordinates of the captured area, such as the captured area 520 for zelle A 510, are logged in the zelle database 400, as shown and described above with respect to FIG. 4. As discussed, this captured area may be slightly larger or smaller than the expected area, e.g., expected area 516, depending on inaccuracies experienced within microscope imaging system 100.

The process then proceeds to the operation represented by the flow diagram decision box 835, where it is determined whether more zelles need to be captured in order to capture the entire sample or samples on the slide 200 at high resolution. If more zelles indeed need to be captured (a "yes" output from the decision box 835), the process proceeds to the operation represented by flow diagram box 840. In the operation 840, the microscope imaging system 100 is commanded to move to the next zelle location. The process then returns to the operation of flow diagram box 825.

However, if no more zelles need to be captured, the process proceeds to the operation represented by flow diagram box 845. Pursuant to this operation, the correlation of the neighboring zelles is calculated in the manner described above. Each zelle 310 is correlated with at least one of its neighbors containing sample content on the slide. As mentioned, a correlation algorithm is performed using duplicate capture regions between two zelles 310 to obtain a correlation score for each zelle relative to all if its neighbors. For example, the duplicate capture regions 610a and 610b between zelle A 510 and zelle B 512 (shown in FIG. 6A), respectively, can be correlated. The process then proceeds to the operation represented by flow diagram box 850, where the correlation scores and offsets for the zelle are registered and stored. In this operation, the offsets and correlation score of each pair of neighboring zelles 310 are stored within the zelle database 400.

In the next operation, represented by the flow diagram decision box 855, it is determined whether another zelle needs to be correlated with at least one neighbor. If another zelle needs to be correlated (a "yes" output from decision box 855), the process returns to the operation of flow diagram box 845 where the correlation process repeats for the next zelle.

If no other zelles need to be correlated (a "no" output from the flow diagram box 855), then the process proceeds to the operation represented by flow diagram box 860. Pursuant to this operation, the anchor point is determined. As discussed above, the anchor point, such as an anchor zelle, is the starting point for piecing together the resultant macro image. The anchor zelle is the zelle by which all adjacent regions will be compared in the initial operation. As discussed above, the anchor point is determined using a calculation of connectedness and centrality for each zelle. The real-world coordinates of the anchor point are logged as its registered coordinates in the zelle database 400. For example, the coordinates of the real-world area 514 of zelle A 510 become its registered coordinates.

The process then proceeds to the operation represented by the flow diagram box 865. Pursuant to this operation, neighboring zelles that are adjacent to the east, west, north and south are attached "on cross" using the previously-calculated offset, as was described above with reference to FIG. 7B. Each neighbor of the anchor zelle 710, such as the east zelle 715 in FIG. 7B, is registered by comparing the offset of each neighbor versus the registered coordinates of the anchor zelle 710. This operation effectively attaches the neighbor zelle contiguously with the anchor zelle.

The process next proceeds to the operation of flow diagram box 870, where the highest correlated neighbor is determined for the anchor zelle (or whatever zelles is currently being processed). Each neighbor zelle 310 of the current zelle (such as east zelle 715, which neighbors zelle 710 in FIG. 7C), that was attached on cross in the operation of flow diagram box 865 may have adjacent zelles 310 that also need registration. For example, the northeast zelle 735 and southeast zelle 740 in FIG. 7C may also need registration. However, the neighbor zelles 310 can have conflicting offsets. For example, the northeast zelle 735 has an offset with both east zelle 715 and north zelle 730. Consequently, the highest correlating neighbor is determined by using correlation calculations from the operation of flow diagram box 845.

The process then proceeds to the next operation, represented by flow diagram box 875. In this operation, neighbor zelles are attached to the current zelle "on square" using the previously-calculated offsets. In this step, each adjacent zelle 310, such as northeast zelle 735 in FIGS. 7C and 7D, is registered by comparing the offset between it and its highest correlating neighbor (as determined in step 870). This effectively attaches the adjacent zelle 310 contiguously with the anchor zelle and neighbors on cross by storing its registered coordinates.

In the next operation, represented by the flow diagram decision box 880 in FIG. 8, it is determined whether more zelles need to be registered. If more zelles indeed need to be registered (a "yes" output from decision box 865), then the process returns to the operation of flow diagram box 865, where the neighboring zelles are registered and attached. If no more zelles need to be registered (a "no" output from decision box 880), then the process ends.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method of registering images captured by a computer controlled microscope, comprising:
   partitioning a microscope image of a microscope slide having a biological sample into a series of segments, wherein each segment comprises a discrete portion of the microscopic image;
   classifying each segment as either an interesting segment that contains at least a portion of the sample or a non-interesting segment that contains none of the sample;
   capturing image data for each of the segments, wherein the image data for each segment includes at least one duplicate region of image data that overlaps with the image data of an adjacent segment;
   determining an anchor segment by which all adjacent segments will be compared, wherein the anchor segment is determined based on which segment has the highest number of adjacent interesting segments; and
   aligning the segments with one another to create a single macroscopic image comprised of the aligned segments.

2. A method as defined in claim 1, wherein the capturing, determining, and aligning steps are performed only on segments classified as interesting.

3. A method as defined in claim 1, further comprising storing attribute data relative to each segment in a database.

4. A method as defined in claim 3, wherein the attribute data include the area covered by each segment as defined by a coordinate system.

5. A method as defined in claim 1, further comprising, for each segment, calculating at least one correlation score indicative of the level of correlation of a segment with each of its adjacent segments, wherein the correlation score is calculated by correlating the duplicate region of the segment to a corresponding duplicate region of an adjacent segment.

6. A method as defined in claim 5, further comprising, for each segment, calculating at least one offset value relative to an adjacent segment, the offset value being indicative of the amount that the segment is offset relative to the adjacent segment.

7. A method as defined in claim 6, wherein aligning the segments with one another comprises:
using the offset values of each of the anchor zelle's adjacent segments to contiguously align each of the adjacent segments to the anchor zelle; and
using the correlation scores to resolve conflicting offset values between the adjacent segments and the anchor segment, wherein the offset value corresponding to the neighbor with the highest correlation score relative to the anchor segment is used to align the neighbor segments to the anchor segment.

8. A method as defined in claim 7, further comprising successively aligning all of the segments to the anchor segment to form the single macroscopic image.

9. A method as defined in claim 8, wherein a north, south, east or west adjacent segment is aligned to a subject segment prior to aligning a diagonal segment to the subject segment.

10. A method as defined in claim 1, wherein the anchor segment is further determined based on which segment is closest to the center of the microscopic image.

11. A computer program on computer readable medium comprising instructions to cause a computer to:
partition a microscopic image into a series of segments, wherein each segment comprises a discrete portion of the microscopic image;
classify each segment as either an interesting segment that contains at least a portion of the sample or a non-interesting segment that contains none of the sample;
capture image data for each of the segments, wherein the image data for each segment includes at least one duplicate region of image data that overlaps with the image data of an adjacent segment;
determine an anchor segment by which all adjacent segments will be compared, wherein the anchor segment is determined based on which segment has the highest number of adjacent interesting segments; and
align the segments with one another to create a single macroscopic image comprised of the aligned segments.

12. A computer program as defined in claim 11, wherein the instructions further cause the computer to:
for each segment, calculate at least one correlation score indicative of the level of correlation of a segment with each of its adjacent segments, wherein the correlation score is calculated by correlating the duplicate region of the segment to a corresponding duplicate region of an adjacent segment.

13. A computer program as defined in claim 12, wherein the instructions further cause the computer to:
for each segment, calculate at least one offset value relative to an adjacent segment, the offset value being indicative of the amount that the segment is offset relative to the adjacent segment.

14. A computer program as defined in claim 13, wherein the instructions further cause the computer to:
use the offset values of each of the anchor zelle's adjacent segments to contiguously align each of the adjacent segments to the anchor zelle; and
use the correlation scores to resolve conflicting offset values between the adjacent segments and the anchor segment, wherein the offset value corresponding to the neighbor with the highest correlation score relative to the anchor segment is used to align the neighbor segments to the anchor segment.

15. A computer program as defined in claim 13, wherein the instructions further cause the computer to successively align all of the segments to the anchor segment to form the single macroscopic image.

16. A computer program as defined in claim 11, wherein the anchor segment is further determined based on which segment is closest to the center of the microscopic image.

17. A microscopic imaging system comprising:
a computer comprising:
a system processor;
a computer program on computer readable medium, the computer program comprising instructions to cause the computer to:
partition a microscopic image into a series of segments, wherein each segment comprises a discrete portion of the microscopic image;
classify each segment as either an interesting segment that contains at least a portion of the sample or a non-interesting segment that contains none of the sample;
capture image data for each of the segments, wherein the image data for each segment includes at least one duplicate region of image data that overlaps with the image data of an adjacent segment;
determine an anchor segment by which all adjacent segments will be compared, wherein the anchor segment is determined based on which segment has the highest number of adjacent interesting segments; and
align the segments with one another to create a single macroscopic image comprised of the aligned segments.

18. A system as defined in claim 17, wherein the instructions further cause the computer to:
for each segment, calculate at least one correlation score indicative of the level of correlation of a segment with each of its adjacent segments, wherein the correlation score is calculated by correlating the duplicate region of the segment to a corresponding duplicate region of an adjacent segment.

19. A system as defined in claim 18, wherein the instructions further cause the computer to:
for each segment, calculate at least one offset value relative to an adjacent segment, the offset value being indicative of the amount that the segment is offset relative to the adjacent segment.

20. A system as defined in claim 19, wherein the instructions further cause the computer to:
use the offset values of each of the anchor zelle's adjacent segments to contiguously align each of the adjacent segments to the anchor zelle; and
use the correlation scores to resolve conflicting offset values between the adjacent segments and the anchor segment, wherein the offset value corresponding to the neighbor with the highest correlation score relative to the anchor segment is used to align the neighbor segments to the anchor segment.

21. A system as defined in claim 19, wherein the instructions further cause the computer to successively align all of the segments to the anchor segment to form the single macroscopic image.

22. A system as defined in claim 17, wherein the anchor segment is further determined based on which segment is closest to the center of the microscopic image.

* * * * *